(12) United States Patent
Ryu et al.

(10) Patent No.: US 11,668,782 B2
(45) Date of Patent: Jun. 6, 2023

(54) ELECTRONIC APPARATUS, CONTROLLING METHOD OF ELECTRONIC APPARATUS AND COMPUTER READABLE MEDIUM

(71) Applicant: SAMSUNG ELECTRONICS CO., LTD., Suwon-si (KR)

(72) Inventors: Jongyoub Ryu, Suwon-si (KR); Geunwoo Kim, Suwon-si (KR); Changhyun Kim, Suwon-si (KR); Soohoon Lee, Suwon-si (KR); Byoungkab Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 16/737,219

(22) Filed: Jan. 8, 2020

(65) Prior Publication Data

US 2020/0217917 A1 Jul. 9, 2020

(30) Foreign Application Priority Data

Jan. 8, 2019 (KR) .................. 10-2019-0002346

(51) Int. Cl.
*G01S 3/801* (2006.01)
*G01S 3/808* (2006.01)
*H04M 1/03* (2006.01)

(52) U.S. Cl.
CPC ............ *G01S 3/801* (2013.01); *G01S 3/8083* (2013.01); *H04M 1/03* (2013.01)

(58) Field of Classification Search
CPC ......... G01S 3/801; G01S 3/8083; H04M 1/03
See application file for complete search history.

(56) References Cited

U.S. PATENT DOCUMENTS

| 8,502,837 B2 | 8/2013 | Griffin |
| 8,755,536 B2 | 6/2014 | Chen et al. |

(Continued)

FOREIGN PATENT DOCUMENTS

| CN | 102598064 A | 7/2012 |
| CN | 103404224 A | 11/2013 |

(Continued)

OTHER PUBLICATIONS

International Search Report dated Apr. 21, 2020 issued by the International Searching Authority in counterpart International Application No. PCT/KR2020/000109 (PCT/ISA/210).

(Continued)

*Primary Examiner* — Isam A Alsomiri
*Assistant Examiner* — Abdallah Abulaban
(74) *Attorney, Agent, or Firm* — Sughrue Mion, PLLC

(57) ABSTRACT

Provided is an electronic apparatus. The electronic apparatus includes an audio receiver configured to obtain an audio signal of sound output by an external object; a sensor configured to sense a posture of the electronic apparatus; a display; and a processor configured to, based on the audio signal that is obtained by the audio receiver, determine a direction in which the external object is located with respect to the electronic apparatus, and control the display to display a graphical object that corresponds to the external object based on the posture of the electronic apparatus sensed by the sensor and the direction in which the external object is located.

14 Claims, 26 Drawing Sheets

(56) References Cited

U.S. PATENT DOCUMENTS

| | | |
|---|---|---|
| 8,767,971 B2 | 7/2014 | Yuzuriha |
| 9,001,154 B2 | 4/2015 | Meier et al. |
| 9,467,786 B2 | 10/2016 | Lee et al. |
| 10,074,215 B2 | 9/2018 | Meier et al. |
| 10,349,171 B2 | 7/2019 | Yoon et al. |
| 10,453,267 B2 | 10/2019 | Meier et al. |
| 10,503,218 B2 | 12/2019 | Suzuki et al. |
| 10,742,792 B2 | 8/2020 | Ryu et al. |
| 10,913,392 B2 | 2/2021 | Morimura |
| 11,410,391 B2 | 8/2022 | Meier et al. |
| 2007/0195012 A1 * | 8/2007 | Ichikawa ............. G02B 27/017 345/8 |
| 2012/0170413 A1 | 7/2012 | Fisher et al. |
| 2012/0218263 A1 | 8/2012 | Meier et al. |
| 2013/0222230 A1 | 8/2013 | Choi et al. |
| 2014/0094225 A1 * | 4/2014 | Lockwood .......... H04M 1/0202 455/566 |
| 2014/0351728 A1 * | 11/2014 | Seo ........................ G06F 9/451 715/766 |
| 2015/0154803 A1 | 6/2015 | Meier et al. |
| 2017/0021768 A1 | 1/2017 | Jaegal et al. |
| 2017/0117005 A1 | 4/2017 | Jerauld |
| 2019/0005734 A1 | 1/2019 | Meier et al. |
| 2019/0019308 A1 | 1/2019 | Iwata |
| 2020/0160605 A1 | 5/2020 | Meier et al. |

FOREIGN PATENT DOCUMENTS

| | | | |
|---|---|---|---|
| CN | 102144406 B | 10/2014 | |
| CN | 104246531 A | 12/2014 | |
| CN | 106155474 A | 11/2016 | |
| CN | 108541323 A | 9/2018 | |
| JP | 2005-99418 A | 4/2005 | |
| JP | 2005099418 A * | 4/2005 | |
| JP | 4576305 B2 | 11/2010 | |
| KR | 10-1253451 B1 | 4/2013 | |
| KR | 10-2014-0000610 A | 1/2014 | |
| KR | 10-2014-0118060 A | 10/2014 | |
| KR | 10-1529516 B1 | 6/2015 | |
| KR | 10-1654738 B1 | 9/2016 | |
| KR | 1020170015759 A | 2/2017 | |
| WO | 2011/076290 A1 | 6/2011 | |
| WO | 2012/112181 A1 | 8/2012 | |
| WO | 2013/155154 A1 | 10/2013 | |
| WO | 2013/155251 A1 | 10/2013 | |
| WO | WO-2013155251 A1 * | 10/2013 | ............. G01B 21/00 |
| WO | 2014/114364 A1 | 7/2014 | |
| WO | WO-2014114364 A1 * | 7/2014 | ............ G01S 3/8022 |

OTHER PUBLICATIONS

International Written Opinion dated Apr. 21, 2020 issued by the International Searching Authority in counterpart International Application No. PCT/KR2020/000109 (PCT/ISA/237).

Communication dated Apr. 24, 2020 issued by the Korean Intellectual Property Office in counterpart Korean Application No. 10-2019-0002346.

Communication dated Jan. 7, 2022 issued by the European Patent Office in European Application No. 20738814.1.

Communication dated Apr. 1, 2022 issued by the China National Intellectual Administration in Chinese application No. 202080008277.2.

Communication dated Sep. 5, 2022 issued by the China National Intellectual Property Administration in Chinese Patent Application No. 202080008277.2.

* cited by examiner

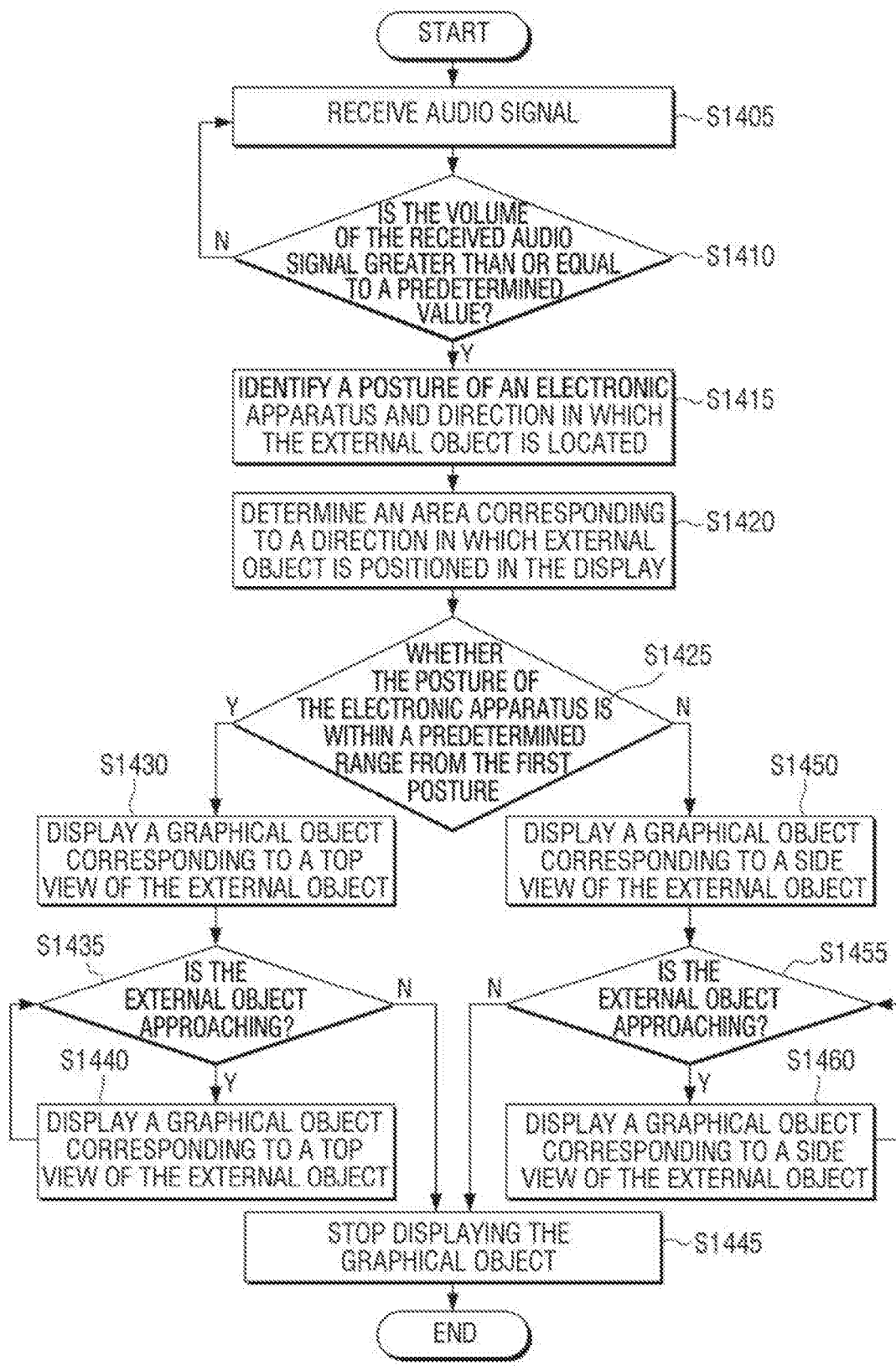

ELECTRONIC APPARATUS, CONTROLLING METHOD OF ELECTRONIC APPARATUS AND COMPUTER READABLE MEDIUM

CROSS-REFERENCE TO RELATED APPLICATION

This application is based on and claims priority under 35 U.S.C. § 119 to Korean Patent Application No. 10-2019-0002346, filed on Jan. 8, 2019, in the Korean Intellectual Property Office, and the disclosure of which is incorporated by reference herein in its entirety.

BACKGROUND

1. Field

The disclosure relates to an electronic apparatus. More specifically, the disclosure relates to an electronic apparatus for identifying a direction of an external object through an audio signal outputted from an external object and intuitively providing the identified direction of the external object to a user through a display.

2. Description of Related Art

With the rapid development of functions provided in a smartphone and large distribution of smartphones, people have become highly dependent on smartphones. However, people who concentrate in an electronic apparatus such as a smartphone, a tablet personal computer (PC), etc., may not notice their surrounding environment and can be unexpectedly exposed to unexpected dangerous situation. In this regard, the term "smombie" has been generated to reflect this phenomenon.

In displaying a position of an external object, in the related art, icons corresponding to each of the electronic apparatus and external objects are merely displayed on a graphic map on which phases of cardinal points north, south, east, and west are displayed, and it is difficult for the user to intuitively grasp the direction of the external object on the basis of the gaze of the user, because the user needs to recognize the direction in which the user is looking in before determining the direction of the external object.

In the related art, in order to identify a direction or a location of the external object through the audio signal output from the external object, it was necessary to use three or more microphones spaced apart by a relatively long distance from each other.

However, in general, a portable device such as a smartphone mostly includes two microphones, and due to a limitation of a size of a portable device, the distance between the microphones of the portable device is very small, and thus there is a limitation in using the reception difference of the audio signal using the distance of the microphone.

SUMMARY

Provided is an electronic apparatus for informing a dangerous element (an external object) by intuitively displaying a direction of an external device based on a gaze of a user viewing a display in consideration of the direction of the display according to the posture of the electronic apparatus and the direction of the external object based on the electronic apparatus.

Also provided is an electronic apparatus that provides information on a direction of an external object through an audio signal output from the external object, while using two microphones that have a comparatively short distance between each other.

Also provided is an electronic apparatus, such as a smartphone, a tablet PC, etc., which performs an operation according to a user command to secure the safety of a so-called 'smombie' which is defenselessly exposed to an unexpected situation or a dangerous element by not recognizing a surrounding situation with eyes and ears, while concentrating on an electronic apparatus such as a smartphone, a tablet PC, etc., and informs a user of the direction and presence of an external object based on the sound of the upcoming external object.

In accordance with an aspect of the disclosure, there is provided an electronic apparatus including: an audio receiver configured to obtain an audio signal of sound output by an external object; a sensor configured to sense a posture of the electronic apparatus; a display; and a processor configured to, based on the audio signal that is obtained by the audio receiver, determine a direction in which the external object is located with respect to the electronic apparatus, and control the display to display a graphical object that corresponds to the external object based on the posture of the electronic apparatus sensed by the sensor and the direction in which the external object is located.

The processor may be further configured to determine an area of the display that corresponds to the direction in which the external object is located, based on the posture of the electronic apparatus, and control the display to display the graphical object in the determined area of the display.

The processor may be further configured to control the display to display the graphical object in a determined shape in the determined area of the display, based on the posture of the electronic apparatus and the direction in which the external object is located.

The processor may be further configured to, based on the posture of the electronic apparatus being within a first predetermined range from a first posture in which the display faces up, control the display to display the graphical object corresponding to a top view of the external object, and based on the posture of the electronic apparatus being within a second predetermined range from a second posture that is perpendicular to a direction of the display from the first posture, control the display to display the graphical object corresponding to a side view of the external object.

The processor may be further configured to, based on the posture of the electronic apparatus being within the first predetermined range from the first posture, control the display to display the graphical object corresponding to the top view at an angle corresponding to the determined area.

The processor may be further configured to, based on the posture of the electronic apparatus being within the second predetermined range from the second posture, control the display to display the graphical object corresponding to the side view at a viewpoint corresponding to the determined area.

The processor may be further configured to identify a speed at which the external object approaches the electronic apparatus by comparing the audio signal obtained by the audio receiver with a prestored audio signal, and provide a notification based on the identified speed.

The processor may be further configured to identify the external object based on the audio signal obtained by the audio receiver, and control the display to display the graphical object corresponding to the identified external object.

The audio receiver may include a first microphone configured to obtain an audio signal of the sound output by the external object; and a second microphone configured to obtain an audio signal of the sound output by the external object, and the processor may be further configured to determine the direction in which the external object is located based on a first audio signal obtained by the first microphone and a second audio signal obtained by the second microphone when the electronic apparatus is in a first position, and at least one of a third audio signal obtained by the first microphone and a fourth audio signal obtained by the second microphone when the electronic apparatus is in a second position.

In accordance with an aspect of the disclosure, there is provided a method of controlling an electronic apparatus, the method including: based on obtaining through an audio receiver of the electronic apparatus an audio signal of sound output from an external object, determining a direction in which the external object is located with respect to the electronic apparatus based on the audio signal; and displaying on a display of the electronic apparatus a graphical object that corresponds to the external object based on a posture of the electronic apparatus sensed through a sensor of the electronic apparatus and the direction in which the external object is located.

The displaying the graphical object may include determining a region in the display that corresponds to the direction in which the external object is located, based on the posture of the electronic apparatus, and displaying the graphical object in the determined area of the display.

The displaying the graphical object may include displaying the graphical object having a determined shape in the determined area of the display, based on the posture of the electronic apparatus and the direction in which the external object is located.

The displaying the graphical object may include, based on the posture of the electronic apparatus being within a first predetermined range from a first posture in which the display faces up, displaying the graphical object corresponding to a top view of the external object, and based on the posture of the electronic apparatus being within a second predetermined range from a second posture that is perpendicular to a direction of the display from the first posture, displaying the graphical object corresponding to a side view of the external object.

The displaying the graphical object may include, based on the posture of the electronic apparatus being within the first predetermined range from the first posture, displaying the graphical object corresponding to the top view at an angle corresponding to the determined area.

The displaying the graphical object may include, based on the posture of the electronic apparatus being within the second predetermined range from the second posture, displaying the graphical object corresponding to the side view at a viewpoint corresponding to the determined area.

The method may further include identifying a speed at which the external object approaches the electronic apparatus by comparing the audio signal obtained through the audio receiver with a prestored audio signal; and providing a notification for a risky situation based on the identified speed.

The method may further include identifying the external object based on the audio signal obtained through the audio receiver, and the displaying the graphical object may include displaying the graphical object corresponding to the identified external object.

The determining the direction in which the external object is located may include determining the direction in which the external object is located based a first audio signal of the sound output by the external object obtained through a first microphone and a second audio signal of the sound output by the external object obtained through a second microphone when the electronic apparatus is in a first position, and at least one of a third audio signal of the sound output by the external object obtained through the first microphone and a fourth audio signal of the sound output by the external object obtained through the second microphone when the electronic apparatus is in a second position.

In accordance with an aspect of the disclosure, there is provided a non-transitory computer readable medium having stored therein a computer instruction which is executed by a processor of an electronic apparatus to perform the method including: based on obtaining through an audio receiver of the electronic apparatus an audio signal of sound output from an external object, determining a direction in which the external object is located with respect to the electronic apparatus based on the audio signal; and displaying on a display of the electronic apparatus a graphical object that corresponds to the external object based on a posture of the electronic apparatus obtained through a sensor of the electronic apparatus and the direction in which the external object is located.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 is a flowchart of displaying a graphical object corresponding to an external object in a method of controlling an electronic apparatus according to an embodiment.

DETAILED DESCRIPTION

Figure 1:
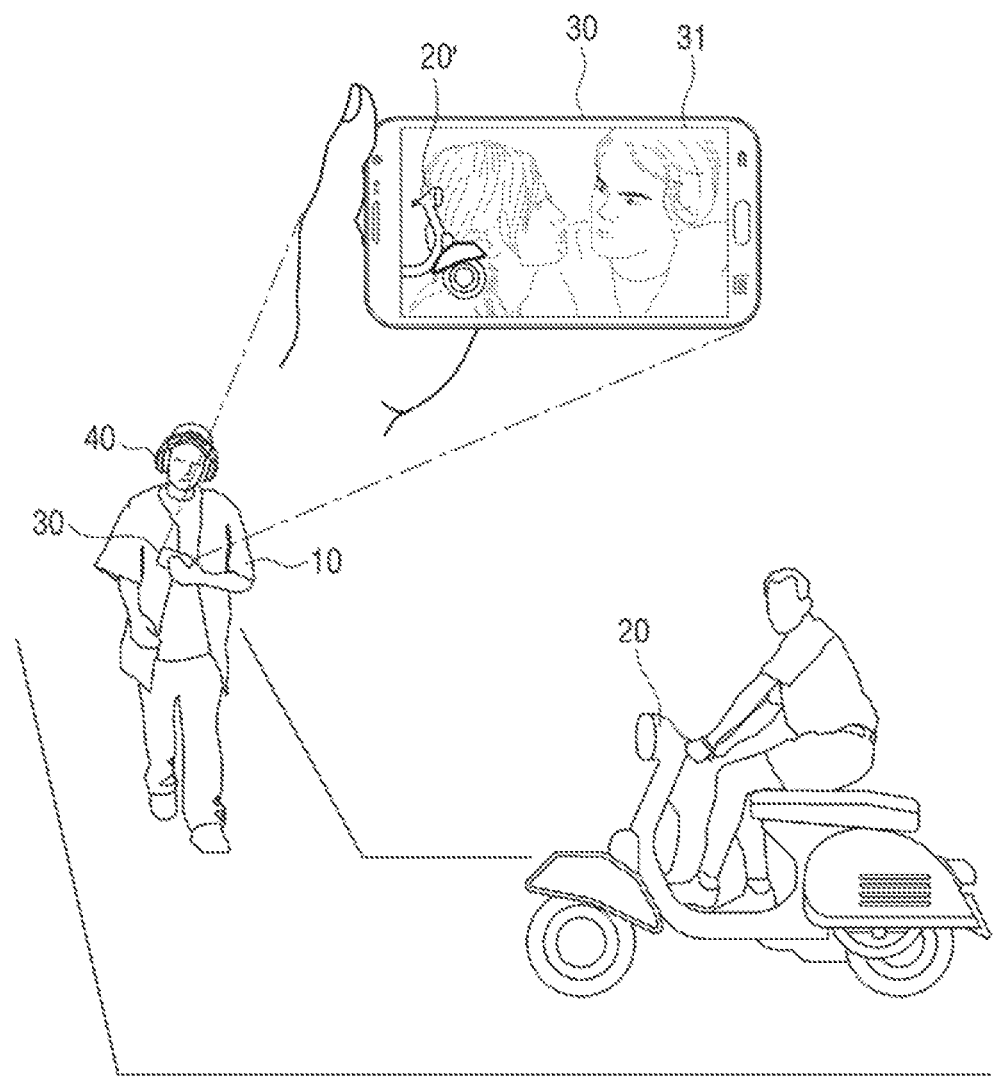
FIG. 1 is an example of an electronic apparatus according to an embodiment.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise," "include," or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

In an embodiment, at least one of configuration 1, configuration 2 or configuration 3 may include "configuration 1 only," "configuration 2 only," "configuration 3 only," "configuration 1 and configuration 2," "configuration 2 and configuration 3," "configuration 1 and configuration 3," and "configuration 1, configuration 2, and configuration 3."

FIG. 1 is an example of an electronic apparatus according to an embodiment.

Referring to FIG. 1, a user 10 who is wearing a headphone 40 and concentrating on an electronic apparatus 30, that is a smartphone, without hearing ambient sound may not hear the sound of a motorcycle 20 which is approaching from a left direction with reference to the gaze of the user 10.

At this time, the electronic apparatus 30 of FIG. 1 can identify the direction of the motorcycle 20 based on an audio signal such as the engine sound output from the motorcycle 20. Additionally, a graphical object 20' corresponding to the motorcycle 20 can be displayed in the left area of the display 31 in consideration of the direction of the display according to the posture or orientation of the electronic apparatus 30. In this case, an alarm sound may be output through the headphone 40 connected by wire or wirelessly to the electronic apparatus 30, the display 31 may be blinking in a red light, or a red warning line may be displayed in an edge portion of the display.

As a result, the user 10 may recognize that the motorcycle 20 is located at the left side or is approaching and prepare for danger.

Figure 2:
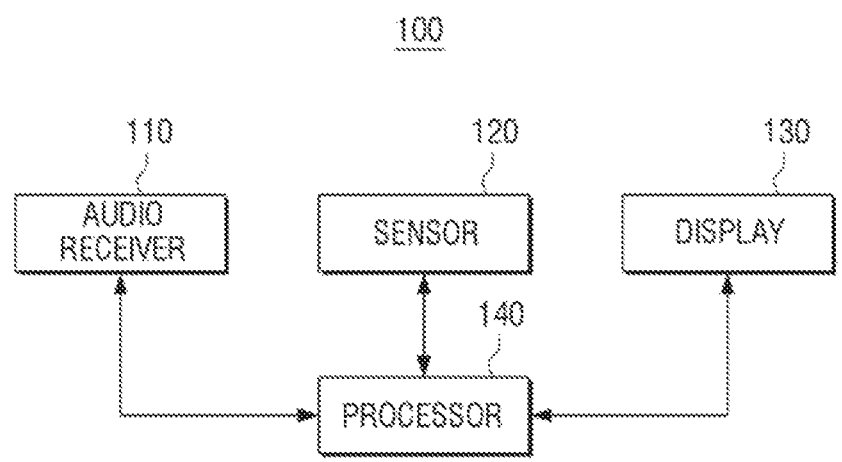
FIG. 2 is a block diagram of an electronic apparatus according to an embodiment.

FIG. 2 is a block diagram of the electronic apparatus 100 according to an embodiment.

The electronic apparatus 100 may be implemented as a portable electronic apparatus such as a mobile phone, a smartphone, a tablet PC, a notebook PC, or the like. The electronic apparatus 100 may be implemented as a driving aid device such as a navigation system provided inside a vehicle, or the like.

The electronic apparatus 100 may be implemented as a wearable device such as a smart watch or a smart glasses capable of displaying at least one image.

Referring to FIG. 2, the electronic apparatus 100 may include an audio receiver 110, a sensor 120, a display 130, and a processor 140.

The audio receiver 110 is configured to receive an external audio signal and may be implemented as a circuitry including at least one microphone. In particular, the audio receiver 110 may include two microphones.

The sensor 120 is a configuration for the electronic apparatus 100 to identify a posture and a position of the electronic apparatus 100. For this, the sensor 120 may be implemented as one or more sensors including a gyro sensor and an acceleration sensor. The sensor 120 may further include at least one of a global positioning system (GPS) sensor and a geomagnetic sensor.

The sensor 120 may include various types of sensors, and the electronic apparatus 100 may obtain information on an external environment or information on a user command through the sensor 120. Various sensors will be described through FIG. 10 below.

The electronic apparatus 100 may identify a posture or orientation of the electronic apparatus 100 through one or more gyro sensor included in the sensor 120. The posture of the electronic apparatus 100 may include information on a rotational angle of the electronic apparatus 100 with reference to at least one of roll, pitch, and yaw.

The display 130 is configured to display one or more images according to the control of the processor 140. For this purpose, the display 130 may be implemented as a liquid crystal display (LCD), a plasma display panel (PDP), an organic light emitting diode (OLED), transparent OLED (TOLED), or the like. In the case of the LCD, the display 170 may include a driving circuit and a backlight unit, which may be implemented in the form of an a-si TFT, a low temperature poly silicon (LTPS) TFT, an organic TFT (OTFT), or the like.

The display 130 may be implemented as a flexible display or a foldable display. The display 130 may be implemented with a material having a flexible characteristic such as a plastic substrate (for example, polymer film) thin glass, or metal foil that can be deformed by an external pressure.

The display 130 may be implemented with a touch screen type including a touch panel capable of sensing a user's touch manipulation.

The processor 140 may control overall operations of the electronic apparatus 100. The processor 140 may include random access memory (RAM), read only memory (ROM), central processing unit (CPU), graphic processing unit (GPU), and system bus, or the like, and may perform operation or data processing related to control of one or more elements included in the electronic apparatus 100.

The processor 140 may execute one or more commands stored in a storage or memory for controlling one or more elements included in the electronic apparatus 100, controlling one or more elements as a hardware circuitry or chip, or controlling one or more elements by the combination of software and hardware.

The processor 140 may be electrically connected to various elements in the electronic apparatus 100 including the audio receiver 110, the sensor 120, the display 130, and a storage and may connect the elements.

The audio receiver 110 may receive sound that is output from an external object and converts the sound into an audio signal that is output to the processor 140. Based on the audio signal output by the audio receiver 110, the processor 140 may determine a direction in which an external object is located relative to the electronic apparatus 100.

Specifically, the processor 140 may determine the direction in which the external object is located relative to the electronic apparatus 100 using the audio signals of the external object output by the first and second microphones included in the audio receiver 110 when the electronic apparatus is in the first position and the audio signal of the external object obtained through at least one of the first and second microphones when the electronic apparatus is in the second position.

Only when the volume of the audio signal output by each of the first microphone and the second microphone is greater than or equal to a predetermined value and the audio signals output by the first microphone and the second microphone match with each other by a predetermined ratio or more, the processor 140 may determine a direction in which the external object is located from the electronic apparatus 100 using the audio signals.

Figure 3A:
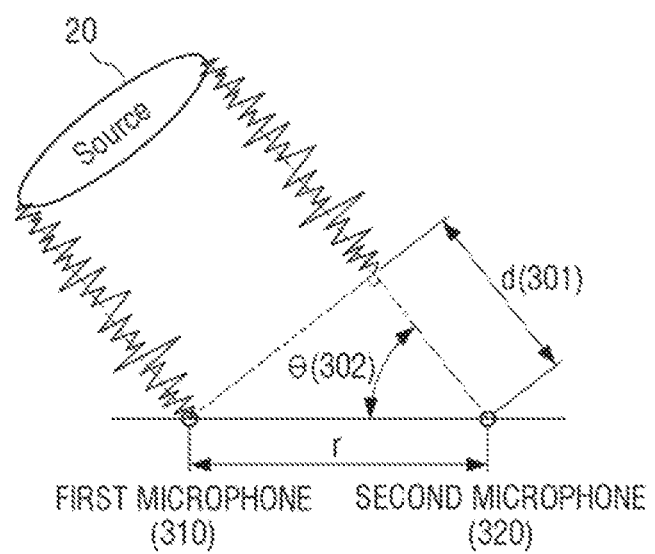
FIG. 3A is a view to describe an example of identifying a direction of an external object using two microphones.
Figure 3B:
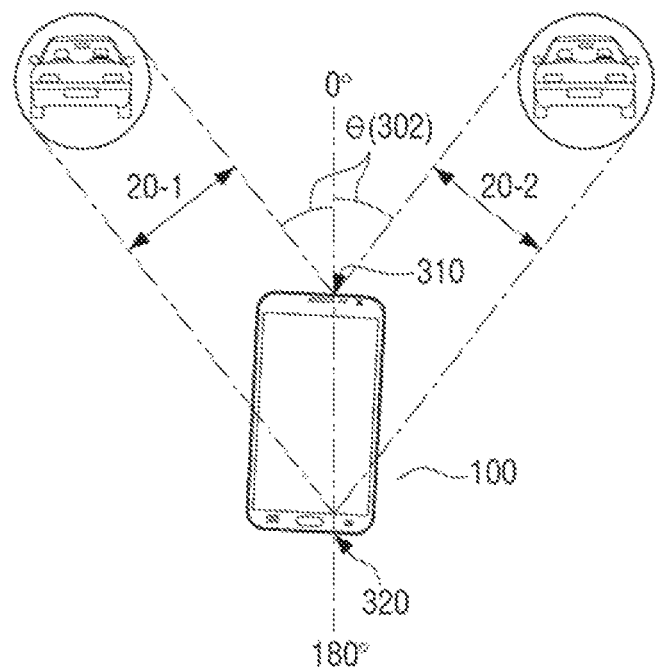
FIG. 3B is a view to describe an example of identifying a direction of an external object using two microphones.
Figure 3C:
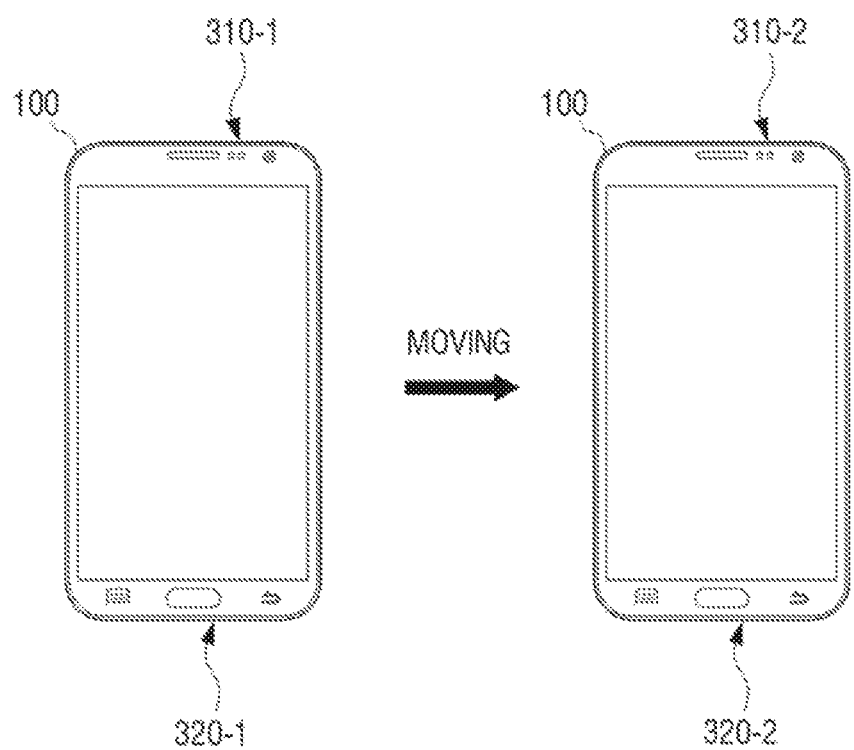
FIG. 3C is a view to describe an example of identifying a direction of an external object using two microphones.

FIGS. 3A, 3B, and 3C are views to describe an example of identifying a direction of an external object using a first microphone 310 and a second microphone 320 included in the audio receiver.

Referring to FIG. 3A, when a sound arrives at a first microphone 310 and a second microphone 320 from the external object 20 corresponding to the source when the electronic apparatus is in the first position, the processor 140 may obtain a value d (301) by using the time difference and the sound velocity of the audio signal obtained by the first microphone 310 and the audio signal obtained by the second microphone 320, respectively.

Through the equation below, the angle θ (302) can be calculated, where r is the distance between the first microphone 310 and the second microphone 320.

$$\theta(302) = \cos^{-1}(d/r)$$

Referring to FIG. 3B, under the premise that the external object is on the surface of the ground, an area where the external object exists may be one of two direction ranges 20-1 and 20-2 with reference to the electronic apparatus 100.

Referring to FIG. 3C, as the electronic apparatus 100 moves and/or the posture of the electronic apparatus 100 is changed, the processor 140 may identify a posture and a position of the electronic apparatus 100 after the movement using at least one of a gyro sensor, an acceleration sensor, a GPS sensor, and a geomagnetic sensor included in the sensor 120. The processor 140 can obtain information about the position of the first microphone 310 and the second microphone 320 which moved (from 310-1 to 310-2, and from 320-1 to 320-2) by identifying the position and posture after the movement.

The processor 140 may identify a direction in which the external object is located with reference to the electronic apparatus 100 before movement, between direction range 20-1 and direction range 20-2, using the result of comparing the audio signal of the external object output by at least one of the first microphone 310 at the position 310-1 and the second microphone 320 at the position 320-2 with the audio signal output by the first microphone 310 at the position 310-1 and the audio signal output by the second microphone 320 at the position 320-1.

The processor 140 can determine the direction in which the external object is located with reference to the electronic apparatus 100 after the movement, by applying the direction in which the external object is located with reference to the electronic apparatus 100 before the movement to the posture and position of the electronic apparatus 100 after the movement. At this time, the time interval before and after the movement (the time interval at which the audio signal is received) can be very short of less than or equal to the millisecond unit, and therefore, the position change of the electronic apparatus 100 before and after the movement may not be almost considered.

The audio signals of the sound output from the external object, that is, the audio signals of the sound obtained through the first microphone 310 and the second microphone 320, may be audio signals having a certain period in amplitude or other characteristics. In general, various sounds, such as a warning sound, an engine operation sound, a klaxon sound, or the like, have a periodicity at least for a short time. Using this periodicity, the processor 140 may identify the time of arrival difference between the sounds received via each microphone before and after the movement.

With reference to FIGS. 3A, 3B, and 3C, it has been described that the audio signal of the sound obtained through the first microphone 310, at position 310-1 before movement, the audio signal of the sound obtained through the second microphone 320 at position 320-1 before movement, and the audio signal of the sound obtained through at least one of the first microphone 310 at position 310-2 and the second microphone 320 at position 320-2 after movement, but it is possible to use the audio signal of the sound obtained through the first microphone 310 at position 310-2, the audio signal of the sound obtained through the second microphone 320 at position 320-1 after movement, and the audio signal of the sound obtained through at least one of the first microphone 310 at position 310-1 and the second microphone 320 at position 320-1 before movement.

It is possible to identify a position of the external object by applying an audio signal (with periodicity) of the sound obtained through at least three microphones among the first microphone 310 at position 310-1 before movement, the second microphone 320 at position 320-1 before movement, the first microphone 310 at position 310-2 after movement, and the second microphone 320 at position 320-2 after movement to the conventional Triangulation.

The processor 140 may control the display to display a graphical object indicating an external object based on a direction where the external object is located with reference to the posture of the electronic apparatus 100 obtained through the sensor 120 and the electronic apparatus 100.

The processor 140 may determine an area corresponding to a direction where the external object is positioned in the display 130 with reference to the posture of the electronic apparatus 100, and control the display 130 to display a graphical object in the determined area.

Specifically, the processor 140 may identify a direction of the display 130 using the posture of the electronic apparatus 100, compare the identified direction with a direction in which the external object is located, and determine a corresponding area.

The processor 140 may identify an external object based on an audio signal of the sound of the external object obtained via the audio receiver 110, and control the display to display a graphical object corresponding to the identified external object. For example, if the external object is an automobile, the graphical object is an image for the vehicle, and if the external object is a motorcycle, the graphical object may be an image for the motorcycle.

For this purpose, the processor 140 may compare the audio signal of the received sound to a pre-stored plurality of audio signals. The plurality of audio signals may be matched to various sound sources. When the audio signal is input, the processor 140 may use a network-learned artificial intelligence (AI) model to determine a type of the sound source of the input audio signal. In this case, the AI model may be stored in a storage of the electronic apparatus 100, or may be stored in an external device capable of receiving or transmitting data by wire or wirelessly.

In addition to determining an area of the display 130 in which the graphical object is displayed, a shape of the graphical object may be determined according to the posture of the electronic apparatus 100 and a direction in which the external object is located.

That is, the processor 140 may control the display 130 to display a graphical object of a shape determined based on the posture of the electronic apparatus 100 and the direction in which the external object is located.

Specifically, when the posture of the electronic apparatus 100 is within a predetermined range from a first posture in which the display 130 faces up, the processor 140 may control the display 130 to display a graphical object corresponding to a top view of the external object. Here, the predetermined range may mean that the posture of the electronic apparatus 100 is rotated within a predetermined angle range from the first posture based on the pitch, the roll, and the yaw axis.

The first posture may include a case where the display 130 faces down as well as a case where the display 130 faces up.

When the posture of the electronic apparatus 100 is within a predetermined range from a second posture perpendicular to the direction in which the display 130 faces in the first posture described above, the processor 140 may control the display 130 to display a graphical object corresponding to a side view of the external object. In other words, the second posture of the electronic apparatus 100 may be within a predetermined range from a posture in which the display 130 is facing a direction parallel to the ground surface. Here, the predetermined range may mean that the electronic apparatus 100 is rotated within a predetermined angle range from the first posture with reference to the pitch, the roll, and the yaw axis.

Here, the term side view means that all views seen from a direction of 360 degrees including front, back, left, and right directions of the specific object are included.

Figure 4:
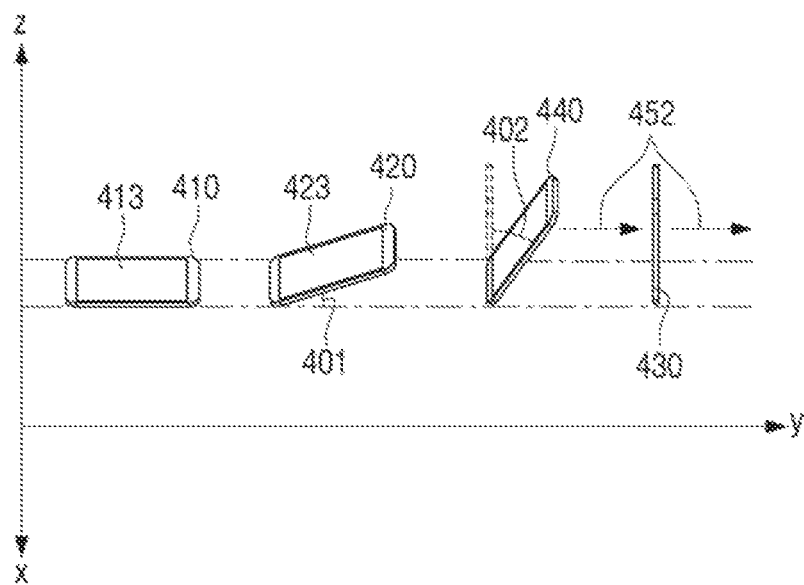
FIG. 4 is a view to describe an example of dividing a posture of an electronic apparatus.

FIG. 4 is a view to describe an example of distinguishing the posture of the electronic apparatus 100 with respect to the graphical object.

Referring to FIG. 4, an electronic apparatus 410 is in a first posture with a display 413 facing up (+z direction). Accordingly, since the electronic apparatus 410 corresponds to the first posture, it is more likely that the user's gaze direction looking at the display 413 is in the downward direction (−z direction). When the electronic apparatus 410 is in the first posture, it is natural to a user that the graphical object displayed on the display 413 of the electronic apparatus 410 corresponds to the top view of the external object, that is, the user viewing the external object.

Additionally, when an electronic apparatus 420, which has been rotated by a predetermined angle 401 from the first posture but within a predetermined range from the first posture, it is also more likely that the user's gaze direction is in the downward direction (−z direction), since the display 423 is still facing the relatively upward direction. Thus, the graphical object corresponding to the top view of the external object may be displayed on the display 423.

Referring to FIG. 4, an electronic apparatus 430 is in the second posture where the display is perpendicular to the display direction, that is, when compared to the direction of the display when the display is in −y direction (the first posture). In this case, since it is highly likely that the gaze direction of the user looking at the display is to be the +y direction 452, the graphical object corresponding to the side view of the external object can be displayed on the display of the electronic apparatus 430.

Further, in an electronic apparatus 440 rotated by a predetermined angle 402 from the second posture but within a predetermined range from the second posture, the display is facing a direction comparatively similar to +y direction, it is likely that the user's gaze direction looking at the display is in the +y direction 452. Therefore, a graphical object corresponding to the side view of the external object may be displayed on the display of the electronic apparatus 440.

When the posture of the electronic apparatus 100 is within a predetermined range from the second posture, the processor 140 may control the display to display a graphical object corresponding to the side view at a viewpoint corresponding to the determined area. At this time, the processor 140 can control the display to display a graphical object corresponding to the orientation of the display 130 in the area determined in the display 130 or the orientation of the external object moving in a direction toward the display 130.

FIGS. 5, 6A, 6B, and 6C are views to describe embodiments to display various graphic objects corresponding to the side view of the external object according to the instruction of the electronic apparatus.

Figure 5:
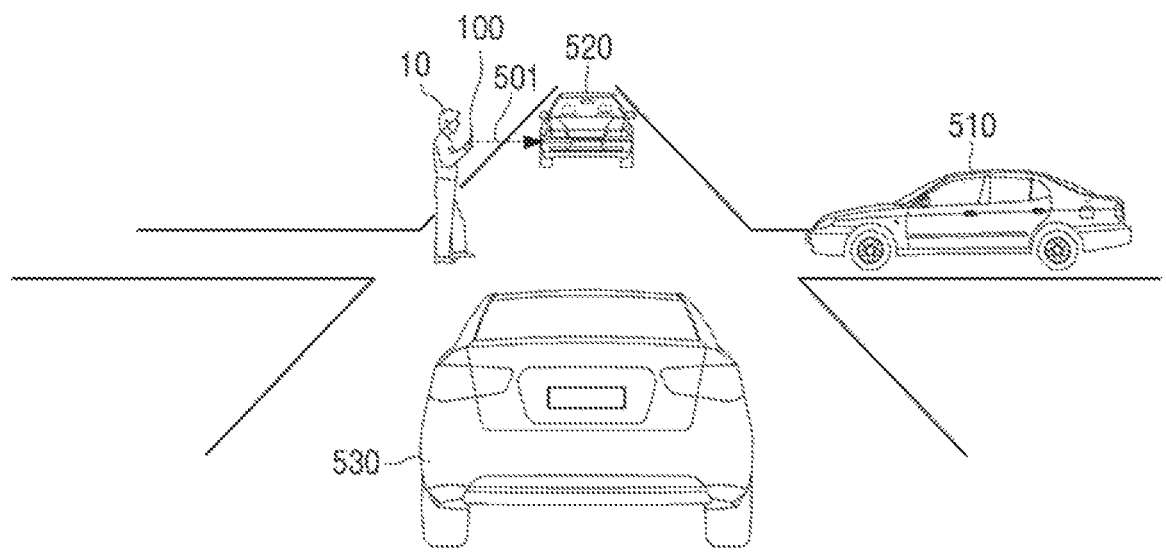
FIG. 5 is a view to describe a posture of an electronic apparatus and situation in which an external object approaches.

Referring to FIG. 5, while the user 10 is holding the electronic apparatus 100 in the second posture or within a predetermined range from the second posture, a first case where an external object 510 is approaching from or is located in the opposite direction of the direction in which the display 130 of the electronic apparatus 100 is facing (front side with reference to the user's gaze), a second case where an external object 520 is approaching from or is located in a right direction (left side with reference to the user's gaze) of the direction which the display 130 faces, and a third case where an external object 530 is approaching from or is located in the left direction (right side with reference to the user's gaze) in the direction toward the display 130, are respectively shown.

Figure 6A:
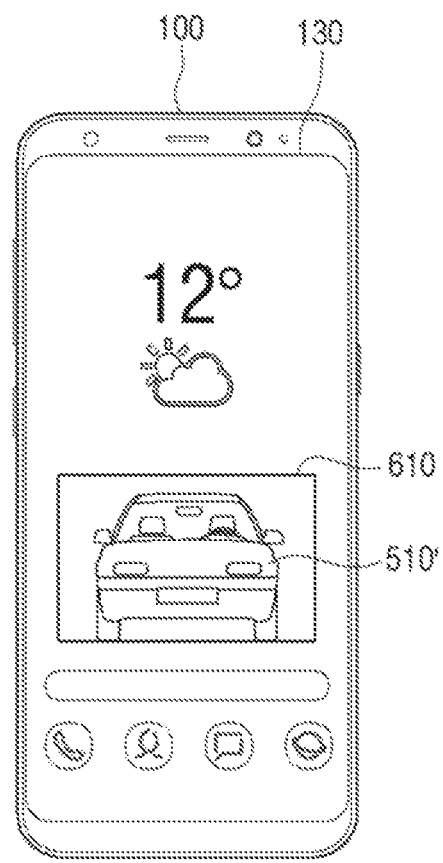
FIG. 6A is a view to describe an example of displaying a graphical object corresponding to a side view of an external object according to a posture of an electronic apparatus.
Figure 6B:
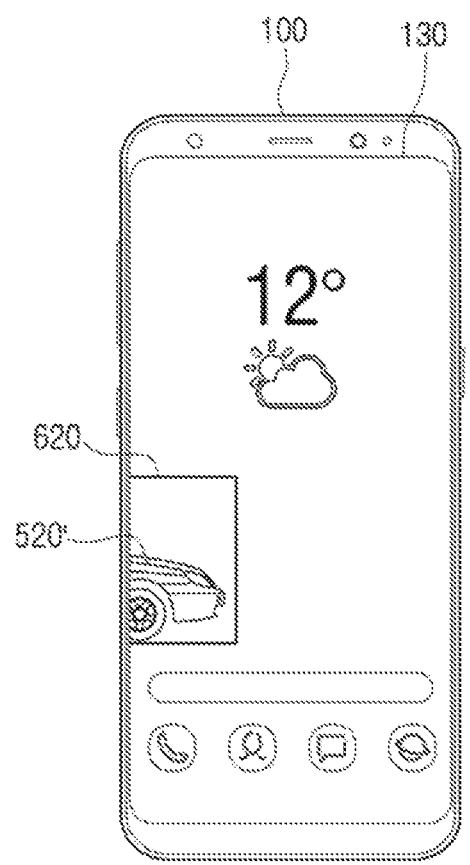
FIG. 6B is a view to describe an example of displaying a graphical object corresponding to a side view of an external object according to a posture of an electronic apparatus.
Figure 6C:
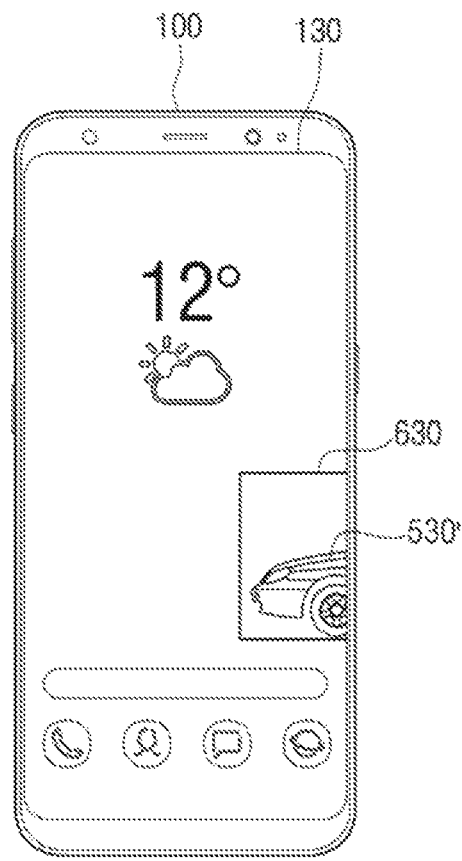
FIG. 6C is a view to describe an example of displaying a graphical object corresponding to a side view of an external object according to a posture of an electronic apparatus.

The first case of the external object 510 corresponds to FIG. 6A, the second case of the external object 520 corresponds to FIG. 6B, and the third case of the external object 530 corresponds to FIG. 6C.

Referring to FIG. 6A, the processor 140 may control the display 130 to display a graphical object 510' corresponding to a front view among side views of the external object 510 on a middle area 610 of the display 130, based on the posture of the electronic apparatus 100 being within a preset range from the second posture and the direction in which the external object 510 is located being the rear direction of the electronic apparatus 100. Specifically, the processor 140 may control the display 130 to display a graphical object 510' corresponding to the front image of the type of the external object 510 such as a car or a motorcycle.

Referring to FIG. 6B, the processor 140 may control the display 130 to display a graphical object 520' corresponding to a view of the external object 520 from the right side, among the side views of the external object 520, on a left area 620 of the display 130, based on the posture of the electronic apparatus 100 being within a predetermined range from the second posture, and the direction in which the external object 520 is positioned being a right direction from the direction in which the display 130 is oriented. To be specific, the processor 140 may control the display 130 to display a graphical object 520' corresponding to the right side image of the type of the external object 520 such as a car or a motorcycle.

As shown in FIG. 6B, the graphical object 520' may not correspond to an entire view of the external object 520 from the right side, but may be a portion thereof. The graphical object 520' may be a front portion of the type of the external object 520.

Referring to FIG. 6C, the processor 140 may control the display 130 to display a graphical object 530' corresponding to the view of the external object 530 from the left side among the side views on the right area 630 of the display 130, based on the posture of the electronic apparatus 100 being within a predetermined range from the second posture and the direction in which the external object 530 is located being the left direction from the direction toward the display 130 of the electronic apparatus 100. Specifically, the processor 140 may control the display 130 to display a graphical object 530' corresponding to a left side image of the type of the external object 530 such as an automobile, a motorcycle, or the like.

As shown in FIG. 6C, the graphical object 530' may not be an entire view of the external object 530 from the left side, but be a portion thereof. In particular, the graphical object 530' may correspond to a front portion of the object corresponding to the type of the external object 530.

Further, when the electronic apparatus 100 is within a predetermined range from the second posture, if the external object is located in a direction toward the display 130 of the electronic apparatus 100 (in the opposite direction of 510 with respect to the user 10), a graphical object 510' that is the same as FIG. 6A is displayed and a mark "rear direction" may be separately displayed on the display 130, or visual/audible notification that an external object is approaching in a rear direction may be provided through the electronic apparatus 100.

The processor 140, when the posture of the electronic apparatus 100 is within a predetermined range from the first posture, may control the display to display the graphical object corresponding to the top view at an angle corresponding to the determined area. Specifically, the processor 140 may control the display 130 to display a graphical object corresponding to a shape that faces toward the center of the display 130 in a determined area of the display 130.

FIGS. 7, 8A, 8B, 8C, and 8D are views to describe examples of displaying various graphical objects corresponding to a top view of an external object according to a posture of an electronic apparatus.

Figure 7:
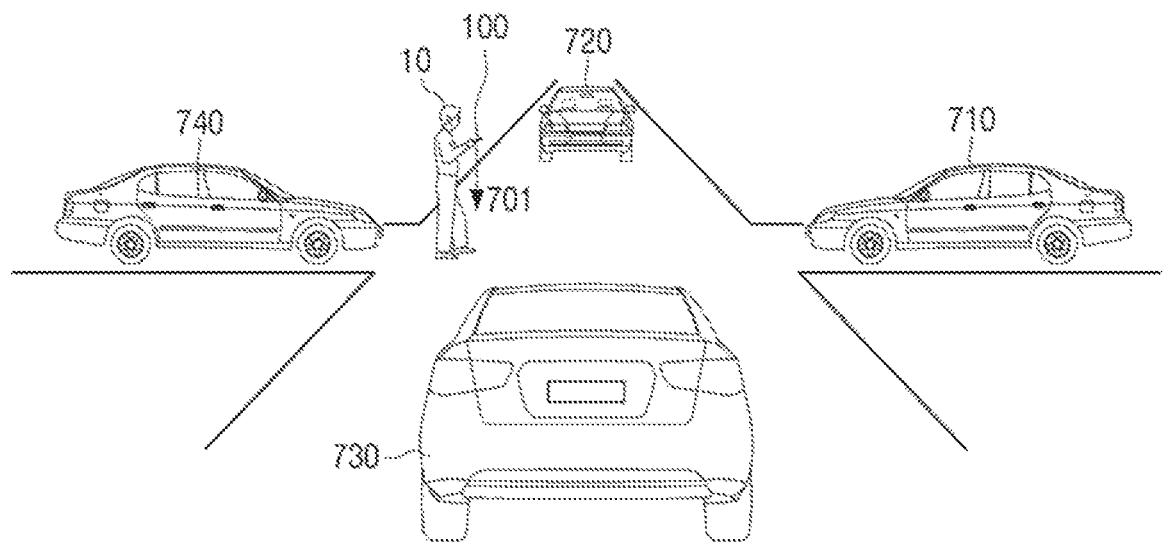
FIG. 7 is a view to describe a posture of an electronic apparatus and situations in which an external object approaches.

Referring to FIG. 7, while the user 10 is holding the electronic apparatus 100 in a first posture or a posture within a predetermined range from the first posture, respectively, a first case where the external object 710 that is a vehicle is approaching from or is located in an upper direction (i.e., a front side with reference to the user) of the electronic apparatus 100, a second case where the external object 720 is approaching from or is located in a left direction of the electronic apparatus 100 (i.e., a left side with reference to the user), a third case where the external object 730 is approaching from or is located in the right direction (i.e., a right side with reference to the user), and a fourth case where the external object 740 is approaching from or is located in a lower direction (i.e., a rear side with reference to the user) of the electronic apparatus 100, are respectively shown.

Figure 8A:
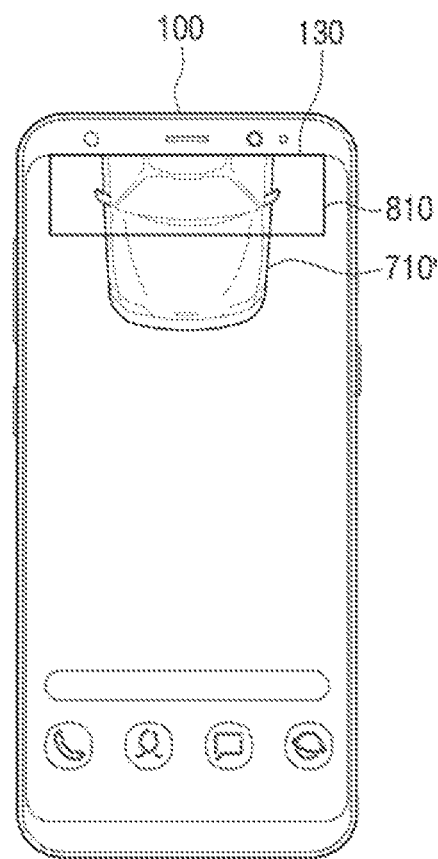
FIG. 8A is a view to describe an example of displaying a graphical object corresponding to a top view of an external object according to a posture of an electronic apparatus.
Figure 8B:
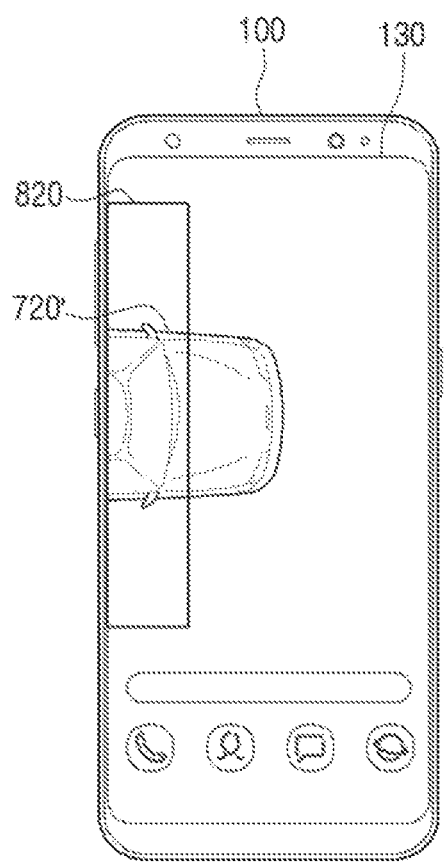
FIG. 8B is a view to describe an example of displaying a graphical object corresponding to a top view of an external object according to a posture of an electronic apparatus.
Figure 8C:
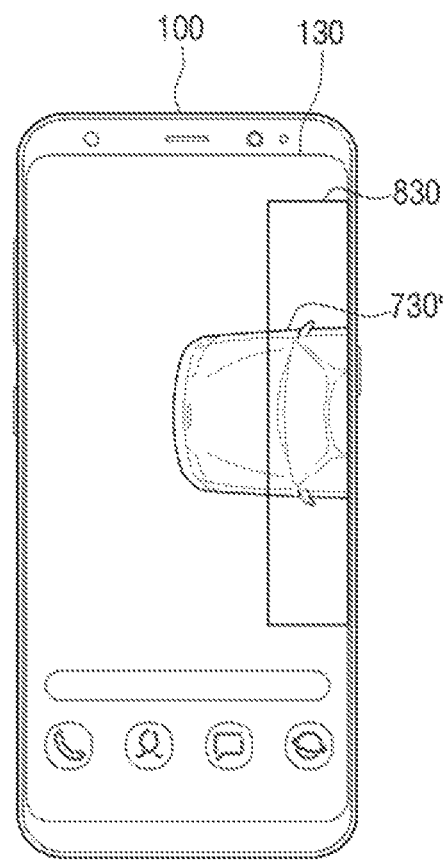
FIG. 8C is a view to describe an example of displaying a graphical object corresponding to a top view of an external object according to a posture of an electronic apparatus.
Figure 8D:
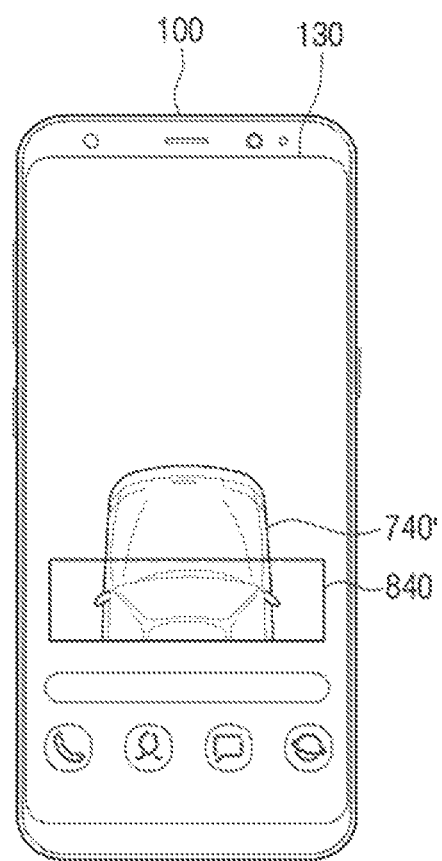
FIG. 8D is a view to describe an example of displaying a graphical object corresponding to a top view of an external object according to a posture of an electronic apparatus.

The first case of the external object 710 corresponds to FIG. 8A, the second case of the external object 720 corresponds to FIG. 8B, the third case of the external object 730 corresponds to FIG. 8C, and the fourth case of the external object 740 corresponds to FIG. 8D.

Referring to FIG. 8A, the processor 140 may control the display 130 to display the graphical object 710' corresponding to the top view of the external object in an upper area 810 of the display 130 based on the posture of the electronic apparatus 100 being within a predetermined range from the first posture and the direction in which the external object is located being the upward direction of the electronic apparatus 100. In this case, the graphical object 710' corresponds to a shape of the display 130 facing toward the center of the display 130 in the upper area 810 of the display 130.

Referring to FIG. 8B, the processor 140 may control the display 130 to display the graphical object 720' corresponding to the top view of the external object in a left area 820 of the display 130 based on the posture of the electronic apparatus 100 being within a predetermined range from the first posture and the direction in which the external object is located being the left direction of the electronic apparatus 100. In this case, the graphical object 720' may correspond to a shape of the display 130 facing toward the center of the display 130 in the left area 820 of the display 130.

Referring to FIG. 8C, the processor 140, based on the posture of the electronic apparatus 100 being within a preset range from the first posture and the direction in which the external object is located being the right direction of the electronic apparatus 100, may control the display 130 to display a graphical object 730' corresponding to the top view of the external object in the right area 830 of the display 130. In this case, the graphical object 730' may correspond to a shape that is facing toward the center of the display 130 in the right area 830 of the display 130.

Referring to FIG. 8D, the processor 140 may control the display 130 to display a graphical object 740' corresponding to the top view of the external object in a lower area 840 of the display 130 based on the posture of the electronic apparatus 100 being within a predetermined range from the first posture and the direction in which the external object is located being the downward direction of the electronic apparatus 100. In this case, the graphical object 740' may correspond to a shape of the display 130 facing toward the center of the display 130 in the lower area 840 of the display 130.

Referring to FIGS. 8A to 8D, each of the graphical objects 710', 720', 730', and 740' does not correspond to the entire top view of the type of the external object, and may correspond to only a portion of the external object. For example, the graphical object ma correspond a front portion of a type of an external object, but it is not limited thereto.

The processor 140 may determine whether the external object is approaching the electronic apparatus 100 using an audio signal of the sound obtained through the audio receiver 110.

When the volume of the audio signal of the sound obtained through the audio receiver 110 increases, the processor 140 may identify that the external object that outputs an audio signal is approaching the electronic apparatus 100.

The processor 140 may compare the audio signal of the sound of the external object obtained through the audio receiver 110 with a prestored audio signal and identify the speed at which the external object approaches the electronic apparatus 100, to determine whether the external object is approaching the electronic apparatus 100.

The processor 140 may identify a type of an external object such as a vehicle, a motorcycle, or the like, using an audio signal of the sound of the external vehicle obtained through the audio receiver 110, compare a plurality of audio signals corresponding to the identified type with the audio signal, and determine the speed at which the external object is approaching the electronic apparatus 100.

The speed at which the external object is approaching the electronic apparatus 100 may be determined based on the fact that, the closer or farther the external object with respect to the electronic apparatus 100, the audio signal received by the electronic apparatus 100 changes according to a Doppler effect.

For example, the processor 140 may identify that the external object is a vehicle based on a result of comparing the received audio signal with a plurality of pre-stored audio signals. And, the processor 140 may compare the received audio signal with an audio signal corresponding to a case in which a vehicle approaches at a speed of 2 m/s among a plurality of pre-stored audio signals, an audio signal corresponding to a case in which a vehicle approaches at a speed of 6 m/s, a case in which a vehicle approaches at a speed of 20 m/s, and a case in which a vehicle moves away at a speed of 10 m/s, etc. As a result, the processor 140 may determine a speed at which the external object, which is a vehicle, is approaching or moving away from the electronic apparatus 100. In this case, when an audio signal is input, a trained network model may be used to determine a speed at which an object outputting the input audio signal is approaching.

The processor 140 may identify whether the external object is approaching or moving away from the electronic apparatus 100, and display a graphical object in a different manner considering the above.

FIGS. 9A to 9F are views to describe embodiments of displaying a graphic object differently as an external object approaches an electronic apparatus.

Figure 9A:
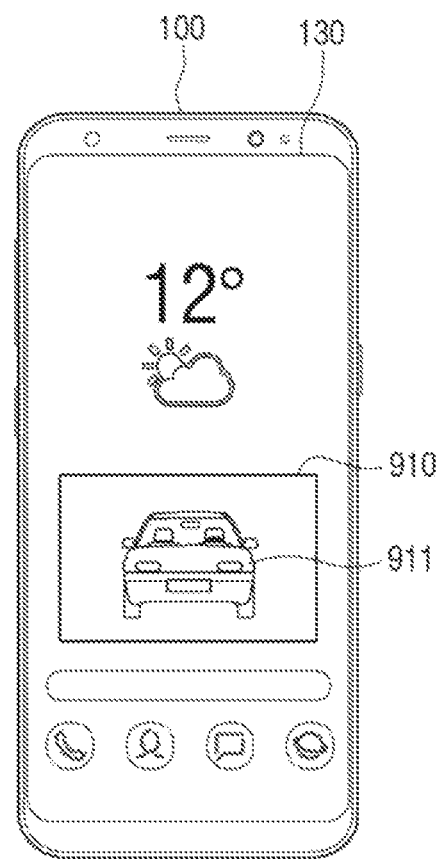
FIG. 9A is a view to describe an embodiment of displaying a graphic object differently as an external object approaches an electronic apparatus.
Figure 9B:
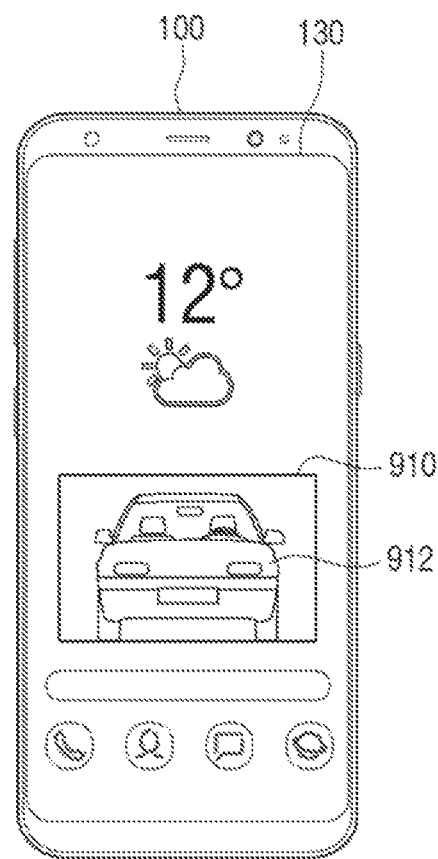
FIG. 9B is a view to describe an embodiment of displaying a graphic object differently as an external object approaches an electronic apparatus.

FIGS. 9A and 9B correspond to the case of the external object 510 of FIG. 5 approaching (getting closer to) and the electronic apparatus 100.

In the case of FIG. 9A, the processor 140 displays a graphical object 911 that is not relatively large in a determined area 910, but as the external object 510 becomes closer to the electronic apparatus 100, a larger graphical object 912 is displayed as FIG. 9B. In this case, if the electronic apparatus 100 and the external object 510 are even closer in the situation of FIG. 9B, the processor 140 may increase the size of the displayed graphical object and, if the distance gets farther, may decrease the size of the graphical object or may not display the graphical object any more.

Figure 9C:
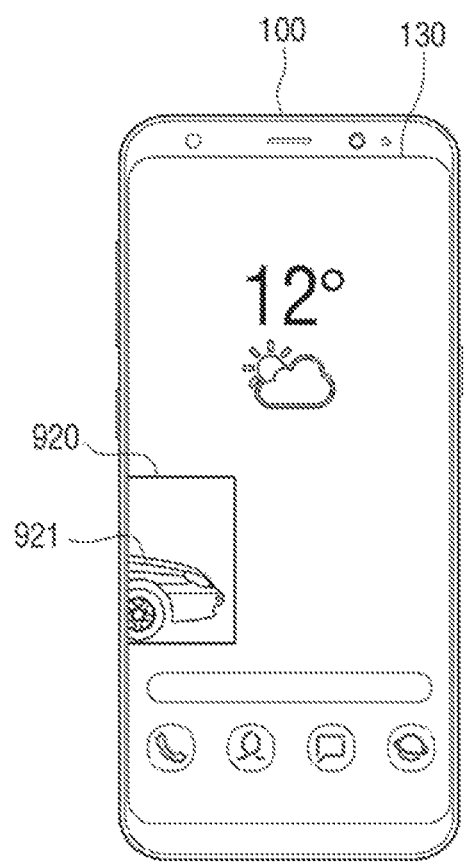
FIG. 9C is a view to describe an embodiment of displaying a graphic object differently as an external object approaches an electronic apparatus.
Figure 9D:
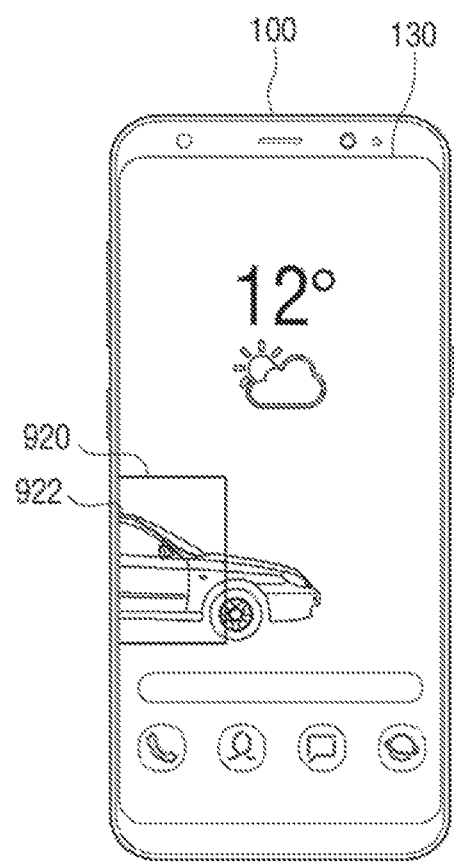
FIG. 9D is a view to describe an embodiment of displaying a graphic object differently as an external object approaches an electronic apparatus.

FIGS. 9C and 9D correspond to the case of the external object 520 of FIG. 5 approaching (getting closer to) the electronic apparatus 100.

In the case of FIG. 9C, the processor 140 displays the graphical object 921 corresponding to a portion that is less than half of the side view of the type of the external object in the determined area 920, but if it is determined that as the external object and the electronic apparatus 100 are closer, a graphical object 922 corresponding to a larger portion of the side view is displayed as shown in FIG. 9D. In this case, if the electronic apparatus 100 and the external object becomes closer in the situation of FIG. 9D, the processor 140 may display a graphical object that corresponds to a larger portion of the side view, and if the distance between the electronic apparatus 100 and the external object gets farther, the processor 140 may display a graphical object that corresponds to a smaller portion of the side view or may not display a graphical object. Unlike FIGS. 9C and 9D, the graphical object 922 may be an image for a larger vehicle than the graphical object 921.

Figure 9E:
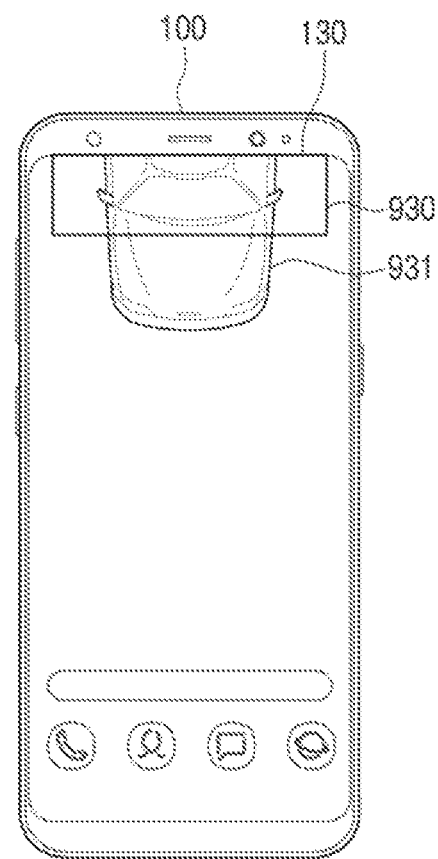
FIG. 9E is a view to describe an embodiment of displaying a graphic object differently as an external object approaches an electronic apparatus.
Figure 9F:
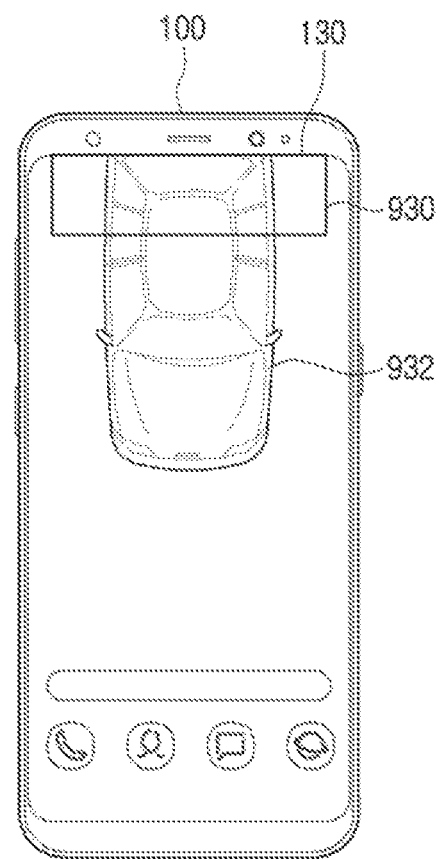
FIG. 9F is a view to describe an embodiment of displaying a graphic object differently as an external object approaches an electronic apparatus.

FIGS. 9E and 9F correspond to the case of the external objection 710 of FIG. 7 approaching (getting closer to) the electronic apparatus 100.

Referring to FIG. 9F, as the external object gets closer to the electronic apparatus 100 than the point of view of FIG. 9E, the processor 140 may display a graphical object 932 increase the portion of the top view of the type of the external object as compared to the graphical object 931 of FIG. 9E. In this case, if the electronic apparatus 100 and the external object are closer together in the situation of FIG. 9F, the processor 140 may display a graphical object 932 corresponding to a larger portion of the top view, and the graphical object may further move to a middle area of the display 130. Conversely, if the distance between the electronic apparatus 100 and the external object becomes farther, the processor 140 may display a graphical object that includes a smaller portion of the top view and the graphical object moves away from the central area of the display 130, or the graphical object may not be displayed any more. The graphical object 932 of FIG. 9F may be an image for a larger vehicle than the graphical object 931 of FIG. 9E.

In FIGS. 9A to 9F described above, it has been described that even if the electronic apparatus 100 is closer to the external object, a determined area 910, 920, and 930 is constant, but unlike FIGS. 9A to 9F, the area where the graphical object is displayed may change like the graphical object. The closer or farther the electronic apparatus is with respect the external object, the shape and/or size of the determined area may change as well. For example, the size and/shape may change to include all the displayed graphical object.

The processor 140 may identify the speed at which the external object approaches the electronic apparatus 100, and then provide a notification for a dangerous situation based on the speed. That is, the faster the speed, the stronger the notification. For example, if the speed at which the external object approaches the electronic apparatus 100 is greater than or equal to a predetermined first value or less than a second value, the processor 140 may control the electronic apparatus 100 to display a warning light to the display 130, and when the speed is greater than or equal to the second value, the processor 140 may control the electronic apparatus 100 to audibly provide a warning sound and display the warning light. As the speed increases, the warning light may be stronger or the warning sound may be louder.

The processor 140 may modify the color or shape of the graphical object according to the speed at which the external object is approaching the electronic apparatus 100. For example, if the speed at which the external object approaches the electronic apparatus 100 is greater than or equal to a predetermined first value, the processor 140 may display a modified graphical object in which the edge or some portions of the graphical object is modified as a red color, or the like, and if the speed is greater than or equal to a second value greater than the first value, the graphical element of the warning light shape may be further displayed, in addition to the modified graphical object.

When the speed at which the external object approaches the electronic apparatus 100 is less than a preset speed, the processor 140 may not display the graphical object, and only in a case where the speed is greater than or equal to a predetermined speed, the processor 140 may display a graphical object in the determined area.

Figure 10:
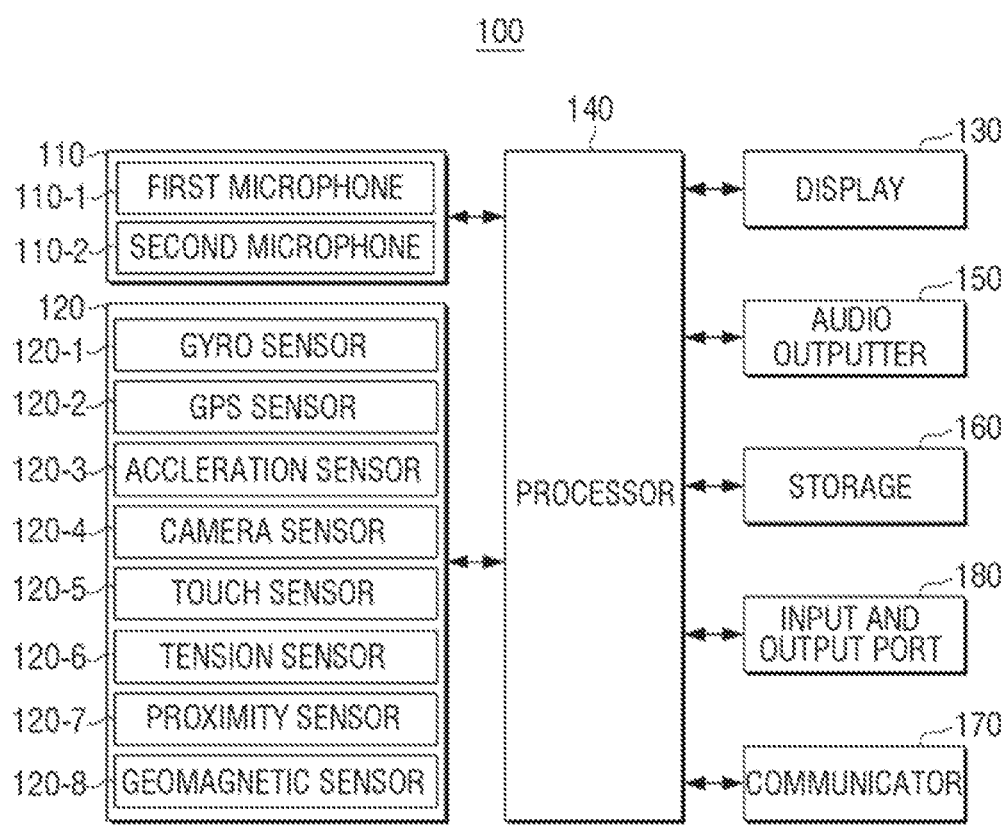
FIG. 10 is a block diagram of an electronic apparatus according to various embodiments.

FIG. 10 is a block diagram of an electronic apparatus 100 according to various embodiments.

Referring to FIG. 10, the electronic apparatus 100 may further include at least one of an audio outputter 150, a storage 160, a communicator 170, and an input and output port 180, in addition to the audio receiver 110, the sensor 120, the display 130, and the processor 140.

Referring to FIG. 10, the audio receiver 110 may include a first microphone 110-1 and a second microphone 110-2. As described above, the processor 140 may identify a direction of the external object that outputs the audio signal, with reference to the electronic apparatus 100 using the audio signal received through the first microphone 110-1 and the second microphone 110-2.

The sensor 120 may include various sensors.

Referring to FIG. 10, the sensor 120 may include a gyro sensor 120-1, a GPS sensor 120-2, an acceleration sensor 120-3, a camera sensor 120-4, a touch sensor 120-5, a tension sensor 120-6, a proximity sensor 120-7, a geomagnetic sensor 120-8, or the like. However, the configuration of the sensor 120 is not limited to a case where the sensors shown in FIG. 10 are included all or only the sensors shown in FIG. 10 are included.

The gyro sensor 120-1 is configured to measure angular velocity or an angle with which the electronic apparatus 100 rotates with respect to at least one axis among roll, pitch, and yaw. The sensor 120 may include one or more gyro sensors 120-1.

The GPS sensor is configured to receive a signal sent from a satellite, and the processor 140 may obtain a position of the electronic apparatus 100 based on the signal received through the GPS sensor.

The acceleration sensor 120-3 is configured to obtain an acceleration at which the electronic apparatus 100 moves, and the processor 140 may obtain the information on the acceleration in at least one axis direction through the acceleration sensor 120-3.

The processor 140 may obtain information on a moving direction and position of the electronic apparatus 100 using the gyro sensor 120-1 and the acceleration sensor 120-3.

The camera sensor 120-4 is configured to obtain at least one image and may be implemented as a digital camera inside the electronic apparatus 100.

The processor 140 may use the image for the user obtained through the camera sensor 120-4 and determine whether the user is viewing the display of the electronic apparatus 100. If it is determined that the user views the display of the electronic apparatus 100, a graphical object for the external object may be displayed on the display 130.

The touch sensor 120-5 is configured to receive a user touch for at least one area of the electronic apparatus 100. The processor 140 may obtain a user command or other information using a user touch that is input through the touch sensor 120-5.

The touch sensor 120-5 may be formed on the display 130 and may be implemented as a touch panel for sensing a touch input of a user for the display 130.

A tension sensor 120-6 is configured to obtain information about bending or curbing of at least a portion of the electronic apparatus 100. If the electronic apparatus 100 is a flexible device or a foldable device, the electronic apparatus 100 may include the tension sensor 120-6. When the shape of the electronic apparatus 100 is modified, the processor 140 may obtain information on the degree of deformation through the tension sensor 120-6, and identify information about the location of each of the first microphone 110-1 and the second microphone 110-2 using the obtained information. The processor 140 may identify information about the distance between the first microphone 110-1 and the second microphone 110-2 using the obtained information.

When the shape of the electronic apparatus 100 is modified, the value "d" in FIG. 3A may be different and thus, in determining by the processor 140 a direction in which the external object is positioned using an audio signal received through the audio receiver 110, information obtained through the tension sensor 160 may be necessary.

A proximity sensor 120-7 is a sensor for detecting at least one object approaching the electronic apparatus 100 and a motion of the corresponding object. The proximity sensor 120-7 may be implemented as various types of sensors such as a high frequency oscillation type to form high frequency magnetic field and detect a current induced by a magnetic field characteristic that changes when an object is approached, a magnetic type to use a magnet, and an electrostatic capacitance type that senses the electrostatic capacity that changes due to the approach of an object.

The processor 140 may use the proximity sensor 120-7 to identify whether the user is in the vicinity of the electronic apparatus 100 or if the user is viewing at the display 130 of the electronic apparatus 100. The processor 140 may display the graphical object for the external object on the display 130 only when the user is in the vicinity of the electronic apparatus 100 or when the user is viewing the display 130 of the electronic apparatus 100.

The geomagnetic sensor 120-8 is a sensor for sensing the electronic apparatus 100 based on the magnetic direction of the Earth. The processor 140 may obtain information on the posture of the electronic apparatus 100 using the geomagnetic sensor 120-8.

The processor 140 may use at least one of the geomagnetic sensor 120-8 and the GPS sensor 120-2 in setting a criterion of at least one angular velocity measured by the gyro sensor 120-1 or at least one acceleration that is measured by the acceleration sensor 120-3.

The audio outputter 150 is configured to output a specific sound according to control of the processor 140. The audio outputter 150 may be implemented as a speaker and/or a headphone and an earphone output terminal.

The processor 140 may display the graphical object and simultaneously provide a warning sound or guide sound in an audible manner to notify the presence of the external object corresponding to the graphical object or approach of the external object using the audio outputter 150.

The storage 160 is configured to store a command or data related to the elements of the electronic apparatus 100 and the operating system (OS) for controlling overall operations of the elements of the electronic apparatus 100.

The storage 160 may be implemented as a non-volatile memory (e.g., a hard disc, a solid state drive (SSD), or a flash memory), a volatile memory, or the like.

In the storage 160, audio signals corresponding to sounds output by various types objects may be stored.

In addition, a plurality of images corresponding to the top view, the side view, or the like, viewed at various angles may be stored in the storage 160. The processor 140 may display, according to the identified external object, a graphical object corresponding to at least one portion or all of the stored plurality of images on the display 130.

In the storage 160, information for an application to determine a direction in which the external object is positioned and perform operations such as displaying a graphical object, by using the received audio signal, may be stored.

The processor 140 may identify a degree of risk using the identified type of external object and the speed at which the external object is approaching, or the like. If the identified risk exceeds a predetermined degree, at least one of the information on the time zone in which the audio signal of the corresponding external object is received and information about a place where the electronic apparatus 100 is in the time zone can be stored in the storage 160.

When the electronic apparatus 100 is located at a corresponding place and/or in the corresponding time zone, the processor 140 may set sensitivity of at least one of the first microphone 110-1 and the second microphone 110-2 included in the audio receiver 110 to be higher than usual.

When the electronic apparatus 100 is located at the corresponding place and/or in the corresponding time zone, the processor 140 may identify the external object using the audio signals of the sound received through the first microphone 110-1 and the second microphone 11002 and determine a direction in which the external object is located.

For example, in a state in which the electronic apparatus 100 is in the first place, if there is a history that an external object corresponding to a vehicle or a motorcycle approached the electronic apparatus 100 at a speed of 5 m/s or more, the processor 140 may determine that the risk of the corresponding situation exceeds a predetermined degree and store at least one of the information about the "9 pm" and "the first place" in the storage 160.

When the electronic apparatus 100 is located within a predetermined distance from "the first place" at a predetermined range of time from "9 pm," the processor 140 may set the sensitivity of the first microphone 110-1 and the second microphone 110-2 to be higher than usual.

Alternatively, the processor 140 may identify the external object using an audio signal of sound received through the audio receiver 110 and may perform operations for determining a direction in which the external object is located only when the electronic apparatus 100 is within a predetermined distance from "the first place" in a predetermined range of time zone from "9 pm." To be specific, the processor 140 may execute an application for performing the operations only when the electronic/apparatus 100 is located within a predetermined distance from "the first place" at a time zone in a predetermined range from "9 pm."

The communicator 170 is configured to perform data communication with an external device by wire or wirelessly. The processor 140 may perform communication with various external devices using the communicator 170.

When performing data communication with an external device in a wireless communication method, the communicator 170 may include at least one of a WiFi direct communication module, a Bluetooth module, an infrared data association (IrDA module, a near field communication (NFC) module, a Zigbee module, a cellular communication module, a 3rd generation (3G) mobile communication module, a fourth generation (4D) mobile communication module, a fourth Long Term Evolution (LTE) communication module.

When performing data communication with an external device by wired communication method, the communicator 170 may be connected to a coaxial cable, an optical cable, or the like, and transceive various data.

Through the input and output port 180, the electronic apparatus 100 may receive a signal/data for an image from the outside or transmit date/signal for an image to the outside.

The input and output port 180 may be implemented as a wired port such as a high-definition multimedia interface (HDMI) port, a display port, a red-green-blue (RGB) port, a digital visual interface (DVI) port, Thunderbolt and component ports.

The input and output port 180 may be implemented with the HDMI port or the Thunderbolt, or the like, and may be implemented to transmit an image and a voice signal, but the first port for transmitting an image signal and the second port for transmitting a voice signal may be separately implemented.

The input and output port 180 may include an interface module, such as a USB, and may be physically connected to an external terminal device such as a PC through the interface module, and transceive voice or image data or transceive firmware data for performing firmware upgrade.

In the above embodiments, the audio receiver 110, the sensor 120, the display 130, the processor 140, or the like, are all included in one electronic apparatus 100, but the above elements may be included in two or more electronic apparatuses capable of wireless and wired communication.

Figure 11:
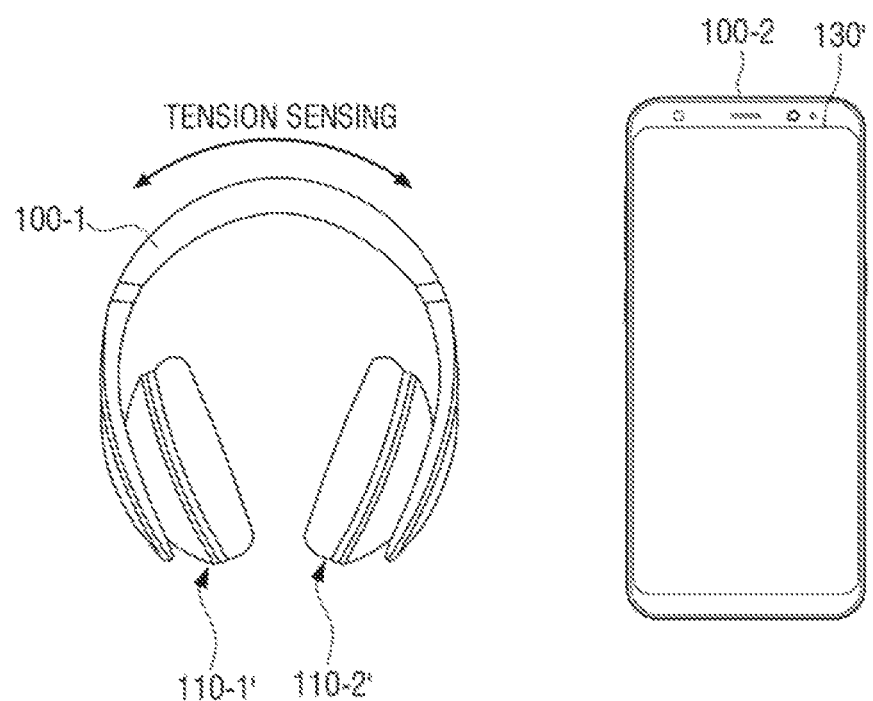
FIG. 11 is a view to describe an example of providing a direction of an external object using a plurality of electronic apparatuses.

FIG. 11 is a view to describe an example of providing a direction of an external object using a plurality of electronic apparatuses.

Referring to FIG. 11, the audio receiver including the first microphone 110-1' and the second microphone 110-2' is included in a headset 100-1, and the display 130 is included in the mobile phone 100-2. FIG. 11 illustrates a situation in which the headset 100-1 and the mobile phone 100-2 are connected to each other through a wired or wireless connection.

The distance between the first microphone 110-1' and the second microphone 110-2' may be different according to a wearing state of the headset 100-1 or a user wearing the headset 100-1 and thus, the headset 100-1 may further include a tension sensor for identifying the distance between microphones.

The mobile phone 100-2 may receive information on the audio signal of the sound received through the microphones 110-1' and 110-2' included in the headset 100-1, determine the type of the external object and the direction in which the external object is located, and then display the graphical object corresponding to the external object on the display 130'.

Hereinafter, a controlling method of the electronic apparatus will be described.

Figure 12:
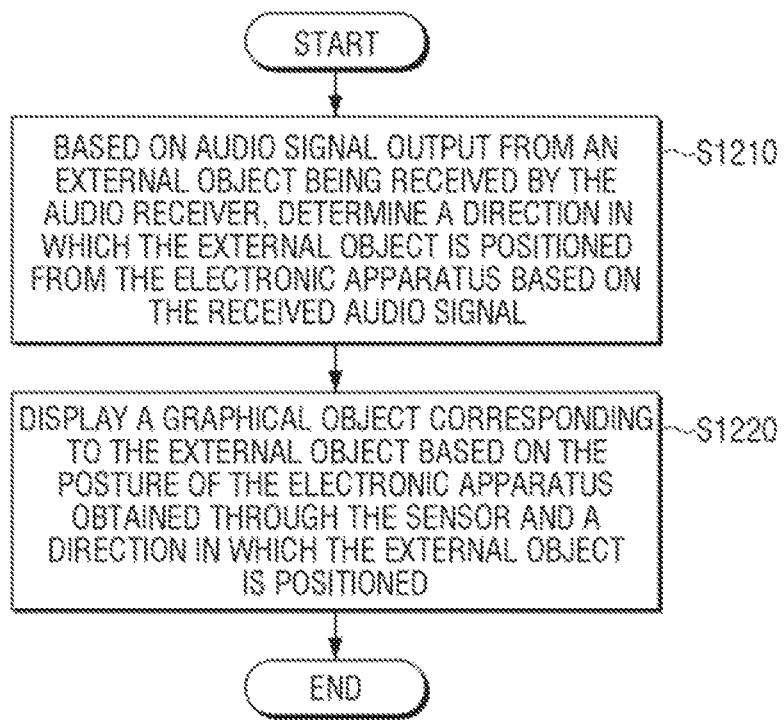
FIG. 12 is a flowchart of a controlling method of an electronic apparatus according to an embodiment.

FIG. 12 is a flowchart of a controlling method of an electronic apparatus according to an embodiment.

Referring to FIG. 12, the controlling method may include, based on an audio signal output from the external object being received from the audio receiver, determining a direction at which the external object is located from the electronic apparatus based on the received audio signal in operation S1210.

A direction in which the external object is located may be determined by using an audio signals of the sound of the external object received through the first and second microphones included in the audio receiver and the audio signal(s) of the sound of the external object received through at least one of the first and second microphones when the electronic apparatus is in the second position.

The graphical object representing the external object can be displayed based on the posture of the electronic apparatus obtained through the sensor and the direction in which the external object is located in operation S1220. At this time, the external object can be identified based on an audio signal of an external object received through the audio receiver, and a graphical object corresponding to the identified external object can be displayed. For example, if the received audio signal is identified as being an engine sound of a "vehicle", a graphical object corresponding to the "vehicle" can be displayed.

The area corresponding to the direction in which the external object is located may be determined on the basis of the posture of the electronic apparatus, and the graphical object can be displayed in the determined area. In addition, a graphical object of a shape determined based on the posture of the electronic apparatus and the direction in which the external object is located can be displayed in the determined area.

As an example, if the posture of the electronic apparatus is within a predetermined range from a first posture in which the display is facing up, a graphical object corresponding to a top view of an external object can be displayed. Specifically, the graphical object corresponding to the top view may be displayed at an angle corresponding to the determined area. In this case, the first posture may also include a posture in which the display faces up, as well as a posture in which the display faces down.

When the posture of the electronic apparatus is within a predetermined range from a second posture perpendicular to the direction in which the display is facing in the first posture, a graphical object corresponding to a side view of the external object can be displayed. Specifically, a graphical object corresponding to the side view viewed from a viewpoint corresponding to the determined area.

The controlling method can compare an audio signal of an external object received through an audio receiver with a pre-stored audio signal to identify a speed in which an external object approaches the electronic apparatus. Based on the identified speed, a notification of the presence or proximity of the external object may be provided.

Figure 13:
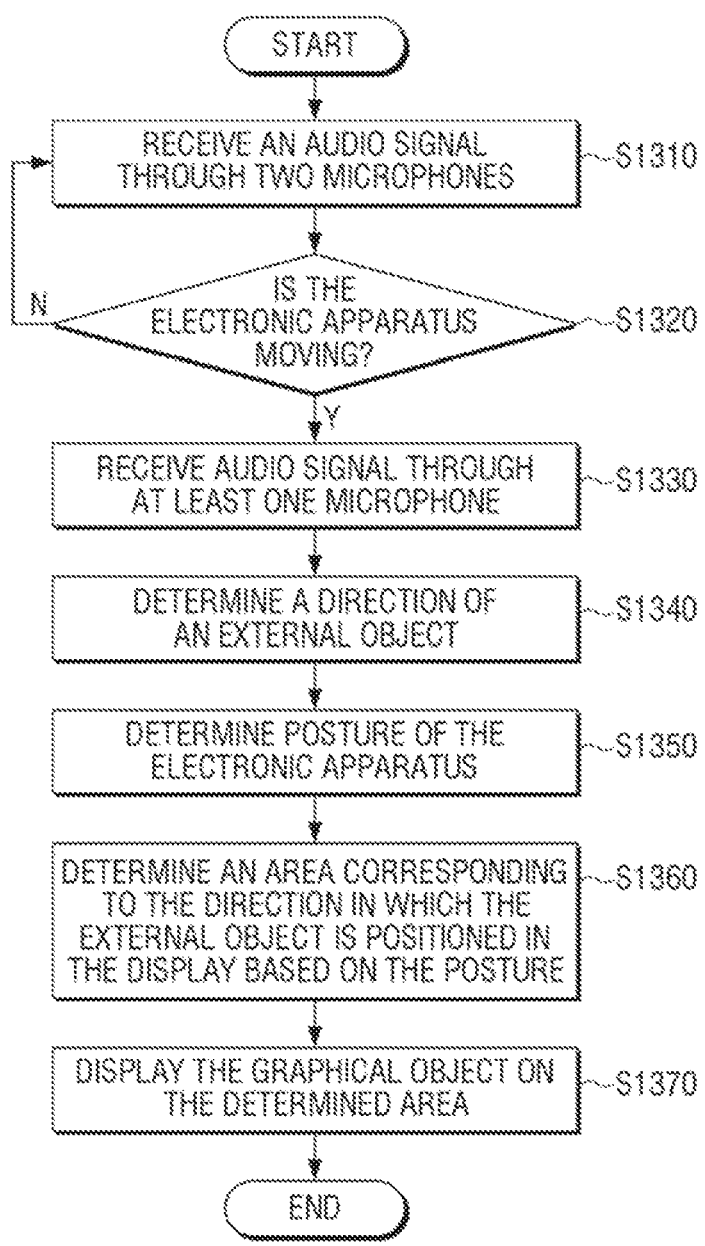
FIG. 13 is a flowchart of a controlling method of an electronic apparatus to determine an area of a display corresponding to a direction of an external object based on an audio signal received through two microphones according to an embodiment.

FIG. 13 is a flowchart of a controlling method of an electronic apparatus to determine an area of a display corresponding to a direction of an external object based on an audio signal received through two microphones according to an embodiment.

Referring to FIG. 13, after the audio signal of the sound is received through two microphones in operation S1310, when the electronic apparatus is moved in operation S1320'—Y, the audio signal of the sound may be received through at least one of the two microphones in operation S1330. At this time, the movement of the electronic apparatus can be determined through at least one of an acceleration sensor and a GPS sensor.

Based on the time difference of arrival of each received audio signal, information about a direction in which an external device is located can be obtained on the basis of the electronic apparatus in operation S1340. In addition, the posture of the electronic apparatus can be determined by using at least one of the gyro sensor and the geomagnetic sensor in operation S1350.

Thereafter, based on the posture of the electronic apparatus, the area corresponding to the direction in which the external object is located is determined in operation S1360, and the graphical object representing the external object can be displayed in the corresponding area in operation S1370. The shape of the graphical object may vary depending on the posture of the electronic apparatus and the direction in which the external object is located.

FIG. 14 is a flowchart of displaying a graphical object corresponding to an external object in a method of controlling an electronic apparatus according to an embodiment.

Referring to FIG. 14, after receiving the audio signal in operation S1405, it is possible to identify whether the volume of the received audio signal is greater than or equal to a predetermined value in operation S1410. If the volume is equal to or greater than a predetermined value in operation S1410—Y, the posture of the electronic apparatus and the direction in which the external object is located may be identified in operation S1415. At this time, the posture of the electronic apparatus can be identified by using the gyro sensor, and the direction in which the external object is located can be identified based on the previously received audio signal.

The area corresponding to the direction in which the external object is located on the display may be determined based on the posture of the electronic apparatus in operation S1420. In this case, if the posture of the electronic apparatus is within a preset range from the first posture in which the display faces up or down in operation S1425—Y, the graphical object corresponding to the top view of the external object may be displayed in operation S1430. The graphical object including at least a part of the top view of the object corresponding to the type of the external object may be displayed.

In this case, by using the volume change of the received audio signal or the result of comparing the received audio signal with the pre-stored plurality of audio signals, whether the external object approaches the electronic apparatus may be identified in operation S1435.

If the external object approaches in operation S1435—Y, the graphical object corresponding to the top view of the external object is still displayed in operation S1440, but the size and/or shape of the graphical object may be changed. Specifically, rather than step S1430, a larger portion of the top view of the object corresponding to the type of external object may be included in the graphical object.

If the external object is not approaching in operation S1435—N, the graphical object can stop being displayed in operation S1445.

If the posture of the electronic apparatus is not in a predetermined range from the first posture in operation S1425—N, the graphical object corresponding to the side view of the external object can be displayed in operation S1450. Specifically, a graphical object including at least a portion of the images viewed from 360-degree angle including front, back, left, and right of the object corresponding to the type of the external object may be displayed.

By using the volume change of the received audio signal and a result of comparing the received audio signal with a plurality of prestored audio signals, whether the external object approaches the electronic apparatus may be identified in operation S1455.

If the external object approaches in operation S1455—Y, the graphical object corresponding to the side view of the external object is still (continuously) displayed in operation S1460, and the size and/or shape of the graphical object may be changed. Specifically, rather than step S1450, a graphical object may be displayed such that the graphical object gets larger or a graphical object that includes a larger portion of the side view of the object corresponding to the type of external object may be displayed.

If the external object does not approach in operation S1435—N, the graphical object may stop being displayed in operation S1445.

The controlling method of the electronic apparatus described with reference to FIGS. 12 and 13 can be implemented through the electronic apparatus 100 shown and described with reference to FIGS. 2 and 10. Alternatively, it may be implemented via a system that includes a plurality of electronic apparatus, and one example is FIG. 11.

The electronic apparatus may notify a user with the presence and direction of the risk factor (external object) by intuitively displaying a direction of the external object based on the gaze of the user viewing the display.

The electronic apparatus may obtain information on the external object through an audio signal output from the external object while using only two microphones.

The various embodiments described above may be implemented in a recordable medium which is readable by computer or a device similar to computer using software, hardware, or the combination of software and hardware.

By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, embodiments described herein may be implemented by the processor 140 itself. According to a software implementation, embodiments such as the procedures and functions described herein may be implemented with separate software modules. Each of the above-described software modules may perform one or more of the functions and operations described herein.

The computer instructions for performing the processing operations in the electronic apparatus 100 according to the various embodiments described above may be stored in a non-transitory computer-readable medium. The computer instructions stored in this non-transitory computer-readable medium cause the above-described specific device to perform the processing operations in the electronic apparatus 100 according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely examples and are not to be construed as limiting the disclosure. The present teaching may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. An electronic apparatus comprising:
   an audio receiver configured to obtain an audio signal of sound output by an external object;
   a sensor;
   a display; and
   a processor configured to:
   based on the audio signal that is obtained by the audio receiver, determine a type of the external object by inputting the audio signal to a pre-trained artificial intelligence to determine a type of a sound source of the audio signal and a direction in which the external object is located with respect to the electronic apparatus,
   determine a posture of the electronic apparatus based on the sensor,
   determine an area of the display that corresponds to the direction, based on the posture of the electronic apparatus,
   determine a shape of the external object being obtained at a viewpoint corresponding to the posture of the electronic apparatus based on the posture of the electronic apparatus and the direction
   determine a type of a graphical object corresponding to the type of the external object, and determine a shape of the graphical object corresponding to the shape of the external object; and
   control the display to display the graphical object having the shape corresponding to the shape of the external object in the determined area of the display, wherein the processor is further configured to:
　　based on the posture being within a first predetermined range of a first posture in which the display faces up, determine the shape of the external object as a vertical view,
　　based on the posture being within a second predetermined range of a second posture that is perpendicular to a direction of the display from the first posture, determine the shape of the external object as a horizontal view, and
　　identify a distance between the electronic apparatus and the external object based on the audio signal and, change a size of the area of the display and a size of the graphical object having the shape corresponding to the shape of the external object based on the distance identified, and
wherein the area of the display is differently identified for the external object in the same direction according to the posture of the electronic apparatus.

2. The electronic apparatus of claim 1, wherein the processor is further configured to:
　　based on the posture of the electronic apparatus being within the first predetermined range from the first posture, control the display to display the graphical object having the shape corresponding to a top view of the external object, and
　　based on the posture of the electronic apparatus being within the second predetermined range from the second posture, control the display to display the graphical object having the shape corresponding to a side view of the external object.

3. The electronic apparatus of claim 2, wherein the processor is further configured to, based on the posture of the electronic apparatus being within the first predetermined range from the first posture, control the display to display the graphical object having the shape corresponding to the top view at an angle corresponding to the determined area.

4. The electronic apparatus of claim 2, wherein the processor is further configured to, based on the posture of the electronic apparatus being within the second predetermined range from the second posture, control the display to display the graphical object having the shape corresponding to the side view at a viewpoint corresponding to the determined area.

5. The electronic apparatus of claim 1, wherein the processor is further configured to:
　　identify a speed at which the external object approaches the electronic apparatus by comparing the audio signal obtained by the audio receiver with a prestored audio signal, and
　　provide a notification based on the identified speed.

6. The electronic apparatus of claim 1, wherein the audio receiver comprises:
　　a first microphone configured to obtain an audio signal of the sound output by the external object; and
　　a second microphone configured to obtain an audio signal of the sound output by the external object, and
　　wherein the processor is further configured to determine the direction in which the external object is located based on a first audio signal obtained by the first microphone and a second audio signal obtained by the second microphone when the electronic apparatus is in a first position, and at least one of a third audio signal obtained by the first microphone and a fourth audio signal obtained by the second microphone when the electronic apparatus is in a second position.

7. A method of controlling an electronic apparatus, the method comprising:
　　based on obtaining through an audio receiver of the electronic apparatus an audio signal of sound output from an external object, determining a type of the external object by inputting the audio signal to a pre-trained artificial intelligence to determine a type of a sound source of the audio signal and a direction in which the external object is located with respect to the electronic apparatus based on the audio signal;
　　determining a posture of the electronic apparatus based on a sensor of the electronic apparatus;
　　determine an area of the display that corresponds to the direction, based on the posture of the electronic apparatus;
　　determining a shape of the external object being obtained at a viewpoint corresponding to the posture of the electronic apparatus based on the posture of the electronic apparatus and the direction;
　　determining a type of a graphical object corresponding to the type of the external object, and determining a shape of the graphical object corresponding to the shape of the external object; and
　　displaying the graphical object having the shape corresponding to the view of the external object,
　　wherein the determining the shape of the external object comprises:
　　based on the posture being within a first predetermined range of a first posture in which the display faces up, determining the shape of the external object as a vertical view, and
　　based on the posture being within a second predetermined range of a second posture that is perpendicular to a direction of the display from the first posture, determining the shape of the external object as a horizontal view, and
　　wherein the displaying the graphical object comprises:
　　　identifying a distance between the electronic apparatus and the external object based on the audio signal and, changing a size of the graphical object based on the distance identified, and
　　wherein the area of the display is differently identified for the external object in the same direction according to the posture of the electronic apparatus.

8. The method of claim 7, wherein the displaying the graphical object comprises:
　　based on the posture of the electronic apparatus being within the first predetermined range from the first posture, displaying the graphical object having the shape corresponding to a top view of the external object, and
　　based on the posture of the electronic apparatus being within the second predetermined range from the second posture, displaying the graphical object having the shape corresponding to a side view of the external object.

9. The method of claim 8, wherein the displaying the graphical object comprises, based on the posture of the electronic apparatus being within the first predetermined range from the first posture, displaying the graphical object having the shape corresponding to the top view at an angle corresponding to the determined area.

10. The method of claim 8, wherein the displaying the graphical object comprises, based on the posture of the electronic apparatus being within the second predetermined range from the second posture, displaying the graphical object having the shape corresponding to the side view at a viewpoint corresponding to the determined area.

11. The method of claim 7, further comprising:
identifying a speed at which the external object approaches the electronic apparatus by comparing the audio signal obtained through the audio receiver with a prestored audio signal; and
providing a notification for a dangerous situation based on the identified speed.

12. The method of claim 7, further comprising identifying the external object based on the audio signal obtained through the audio receiver,
wherein the displaying the graphical object comprises displaying the graphical object corresponding to the identified external object.

13. The method of claim 7, wherein the determining the direction in which the external object is located comprises determining the direction in which the external object is located based a first audio signal of the sound output by the external object obtained through a first microphone and a second audio signal of the sound output by the external object obtained through a second microphone when the electronic apparatus is in a first position, and at least one of a third audio signal of the sound output by the external object obtained through the first microphone and a fourth audio signal of the sound output by the external object obtained through the second microphone when the electronic apparatus is in a second position.

14. A non-transitory computer readable medium having stored therein a computer instruction which is executed by a processor of an electronic apparatus to perform the method comprising:
based on obtaining through an audio receiver of the electronic apparatus an audio signal of sound output from an external object, determining a type of the external object by inputting the audio signal to a pre-trained artificial intelligence to determine a type of a sound source of the audio signal and a direction in which the external object is located with respect to the electronic apparatus based on the audio signal;
determining a posture of the electronic apparatus based on a sensor of the electronic apparatus;
determine an area of the display that corresponds to the direction, based on the posture of the electronic apparatus;
determining a shape of the external object being obtained at a viewpoint corresponding to the posture of the electronic apparatus based on the posture of the electronic apparatus and the direction;
determining a type of a graphical object corresponding to the type of the external object, and determining a shape of the graphical object corresponding to the shape of the external object; and
displaying the graphical object having the shape corresponding to the view of the external object,
wherein the determining the shape of the external object comprises:
based on the posture being within a first predetermined range of a first posture in which the display faces up, determining the shape of the external object as a vertical view, and
based on the posture being within a second predetermined range of a second posture that is perpendicular to a direction of the display from the first posture, determining the shape of the external object as a horizontal view, and
wherein the displaying the graphical object comprises:
identifying a distance between the electronic apparatus and the external object based on the audio signal, and
changing a size of the graphical object based on the distance identified, and
wherein the area of the display is differently identified for the external object in the same direction according to the posture of the electronic apparatus.

\* \* \* \* \*